(12) United States Patent
Wang

(10) Patent No.: US 12,728,376 B2
(45) Date of Patent: Sep. 8, 2026

(54) FILTERING ELEMENT, DUST COLLECTION PILE, AND CLEANING SYSTEM

(71) Applicant: Beijing Roborock Technology Co., Ltd., Beijing (CN)

(72) Inventor: Chengyang Wang, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 286 days.

(21) Appl. No.: 18/557,082

(22) PCT Filed: Apr. 1, 2022

(86) PCT No.: PCT/CN2022/084868
§ 371 (c)(1),
(2) Date: Oct. 25, 2023

(87) PCT Pub. No.: WO2022/228036
PCT Pub. Date: Nov. 3, 2022

(65) Prior Publication Data
US 2024/0226792 A1 Jul. 11, 2024

(30) Foreign Application Priority Data
Apr. 25, 2021 (CN) ......................... 202110466451.4

(51) Int. Cl.
*B01D 46/10* (2006.01)
*A47L 9/00* (2006.01)
(Continued)

(52) U.S. Cl.
CPC .......... *B01D 46/103* (2013.01); *A47L 9/0063* (2013.01); *B01D 46/0005* (2013.01);
(Continued)

(58) Field of Classification Search
CPC .. B01D 46/103; B01D 46/0005; B01D 46/16; B01D 2265/06; B01D 2271/02;
(Continued)

(56) References Cited

U.S. PATENT DOCUMENTS

2008/0010958 A1 1/2008 Fester et al.
2009/0307866 A1 12/2009 Witter et al.
(Continued)

FOREIGN PATENT DOCUMENTS

CN 105125143 A 12/2015
CN 105588320 A 5/2016
(Continued)

OTHER PUBLICATIONS

Second Office Action for CN Patent Application No. 2021104664514 of May 24, 2025.
(Continued)

*Primary Examiner* — Qianping He
(74) *Attorney, Agent, or Firm* — Perilla Knox & Hildebrandt LLP; Kenneth A. Knox

(57) ABSTRACT

A filtering element, a dust collection pile, and a cleaning system are disclosed. The filtering element includes a frame and a filter screen. The filter screen id disposed on the frame. A receiving groove is formed on the filter screen. The receiving groove includes a first opening, a second opening, and a third opening, wherein the first opening and the second opening are provided opposite to each other, and both ends of the third opening penetrate through the first opening and the second opening.

13 Claims, 26 Drawing Sheets

(51) Int. Cl.
*B01D 46/00* (2022.01)
*B01D 46/16* (2006.01)

(52) U.S. Cl.
CPC ........ *B01D 46/16* (2013.01); *A47L 2201/024* (2013.01); *B01D 2265/06* (2013.01); *B01D 2271/02* (2013.01); *B01D 2279/55* (2013.01)

(58) Field of Classification Search
CPC ... B01D 2279/55; B01D 46/64; A47L 9/0063; A47L 2201/024; A47L 9/106; A47L 2201/02; A47L 11/4091; A47L 7/0004; A47L 9/1683; A47L 11/4025; A47L 9/1608
USPC ........................................................... 55/502
See application file for complete search history.

(56) References Cited

U.S. PATENT DOCUMENTS

| | | | | |
|---|---|---|---|---|
| 2013/0337728 | A1* | 12/2013 | Walker | B23Q 11/0046 173/75 |
| 2016/0166126 | A1 | 6/2016 | Morin et al. | |
| 2019/0168151 | A1* | 6/2019 | Biltcliffe | F04D 25/08 |
| 2021/0000315 | A1 | 1/2021 | Na et al. | |
| 2021/0268413 | A1* | 9/2021 | Stamey, Jr. | B01D 46/527 |
| 2022/0287537 | A1* | 9/2022 | Wang | B01D 29/03 |

FOREIGN PATENT DOCUMENTS

| | | | | |
|---|---|---|---|---|
| CN | 206434281 | U | 8/2017 | |
| CN | 107178893 | A | 9/2017 | |
| CN | 107822571 | A | 3/2018 | |
| CN | 207928283 | U * | 10/2018 | |
| CN | 109349957 | A | 2/2019 | |
| CN | 109567680 | A | 4/2019 | |
| CN | 111557614 | A | 8/2020 | |
| CN | 211633113 | U | 10/2020 | |
| CN | 111870182 | A | 11/2020 | |
| CN | 212307728 | U | 1/2021 | |
| CN | 214945185 | U | 11/2021 | |
| CN | 215305493 | U | 12/2021 | |
| CN | 215305518 | U | 12/2021 | |
| CN | 215305519 | U | 12/2021 | |
| CN | 215305523 | U | 12/2021 | |
| CN | 215584021 | U | 1/2022 | |
| JP | H11267435 | A | 10/1999 | |
| JP | 2011036447 | A | 2/2011 | |
| KR | 20020036091 | A | 5/2002 | |
| KR | 200337087 | Y1 * | 12/2003 | B01D 46/12 |
| KR | 100565584 | B1 | 3/2006 | |
| KR | 20090061461 | A | 6/2009 | |

OTHER PUBLICATIONS

International Search Report for International Application No. PCT/CN2022/084868 mailed Jun. 8, 2022.

Extended European Search Report for EP Patent Application No. 22794508.6 for Feb. 14, 2025.

First Office Action for CN Patent Application No. 2021104664514 of Nov. 25, 2024.

Second Office Action for EP Patent Application No. 22794508.6 of May 15, 2026.

* cited by examiner

FILTERING ELEMENT, DUST COLLECTION PILE, AND CLEANING SYSTEM

CROSS-REFERENCE TO RELATED APPLICATIONS

The present application is a national stage under 35 U.S.C. § 371 of International Application No. PCT/CN2022/084868, filed on Apr. 1, 2022, which claims the benefit of and priority to Chinese Patent Application No. 202110466451.4, filed on Apr. 25, 2021, the contents of all of which are incorporated by reference in their entireties herein for all purposes.

TECHNICAL FIELD

The present disclosure relates to the field of intelligent home technologies and, more particularly, to a filtering element, a dust collection pile, and a cleaning system.

BACKGROUND

In the field of intelligent cleaning, filtering elements are the most commonly used filtering structures. The filtering elements used in the related art are all cylindrical filtering elements. Although they are relatively large in size, filtering effect thereof is not significantly improved, and a larger space is occupied.

SUMMARY

The present disclosure provides a filtering element, a dust collection pile, and a cleaning system to improve the usage performance of the filtering element.

According to a first aspect of the present disclosure, a filtering element is provided. The filtering element includes a frame; and a filter screen, where the filter screen is disposed on the frame, an avoidance groove is formed in the filter screen, the avoidance groove includes a first opening, a second opening and a third opening, the first opening and the second opening are disposed opposite to each other, and both ends of the third opening are communicated with the first opening and the second opening respectively.

According to a second aspect of the present disclosure, a dust collection pile is provided. The dust collection pile includes the above-mentioned filtering element.

According to a third aspect of the present disclosure, a cleaning system is provided. The cleaning system includes the above-mentioned dust collection pile and a cleaning robot.

BRIEF DESCRIPTION OF THE DRAWINGS

Various objects, features, and advantages of the present disclosure will become more apparent by considering the following detailed description of the various embodiments of the present disclosure in conjunction with the accompanying drawings. The accompanying drawings are merely exemplary illustration of the present disclosure, and are not necessarily drawn to scale. In the accompanying drawings, same reference signs indicate the same or similar components throughout. In the accompanying drawings.

Figure 1:
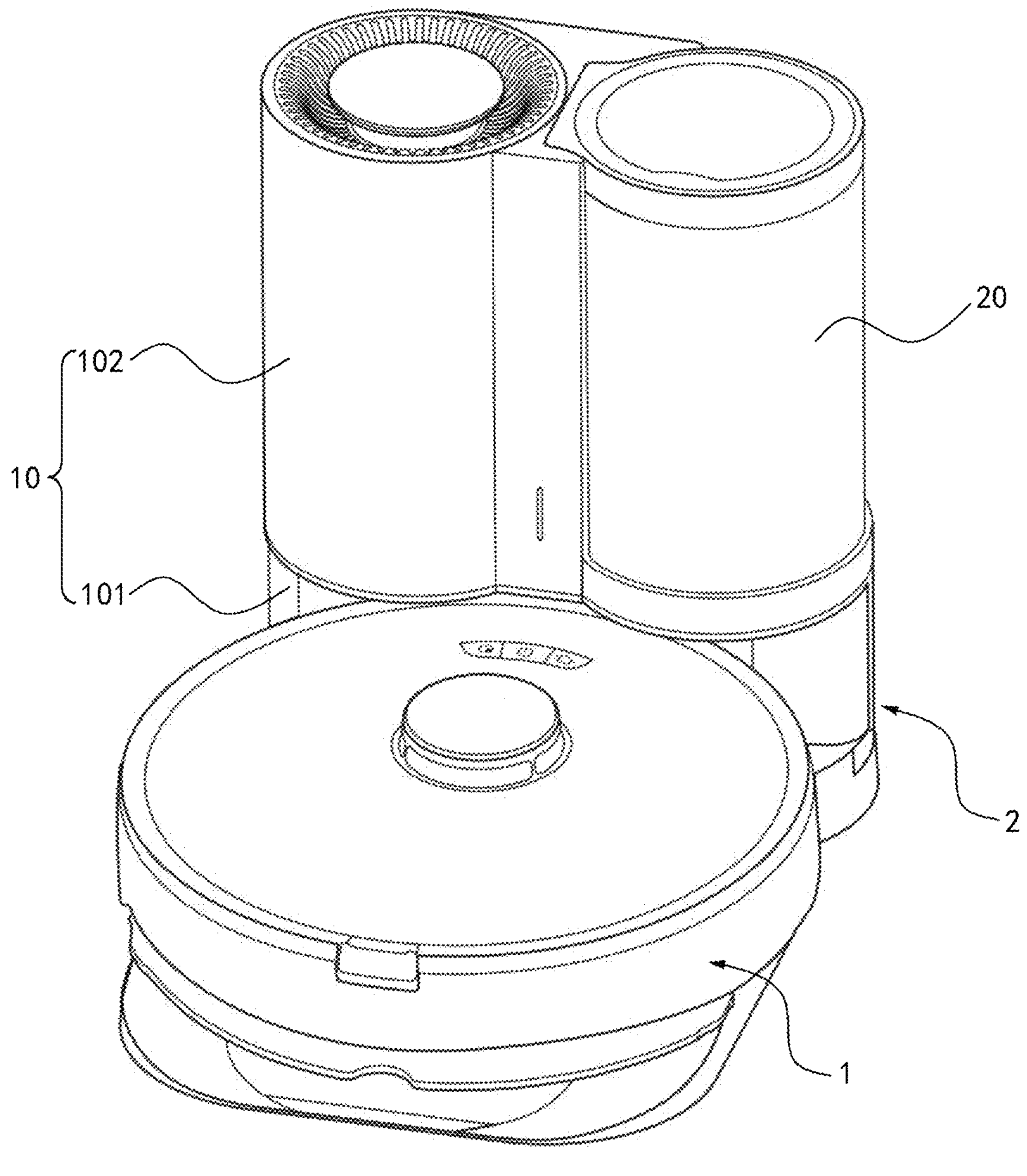
FIG. 1 is a schematic structural diagram of a cleaning system shown according to an exemplary embodiment.

Reference Numerals represent the following components:

1. cleaning robot; 2. dust collection pile;

10. body; 101. base; 102. mounting body; 103. first charging contact tab; 11. dust inlet channel; 111. dust inlet; 12. liquid outlet hole; 13. first mounting portion; 131. switch; 132. detection button; 133. elastic member; 14. second mounting portion; 15. first channel; 16. mounting groove; 17. communication pipe; 18. second channel; 19. sealing groove;

20. dust barrel; 21. dust inlet end; 22. airflow outlet end; 23. dust bag; 231. transition portion; 24. cyclone separator; 25. dust bag transition device;

30. filtering assembly; 31. air inlet end; 32. air outlet end; 33. dust containing member: 34. filtering portion; 35. top cover; 351. air inlet channel;

40. fan assembly; 41. air inlet; 42. air outlet; 43. housing; 431. first housing member: 4311. space; 4312. wind hole; 432. second housing member; 433. airflow through hole; 434. air discharging hole; 44. fan; 45. flexible member; 451. first flexible portion; 452. second flexible portion; 46. air discharging channel; 47. silencer;

50. filtering element; 51. air collecting port; 52. air outlet surface; 53. opening; 54. frame; 541. frame body; 542. sealing member; 543. first support; 544. second support; 545. first connecting section; 546. second connecting section; 55. filter screen; 56. avoidance groove; 561. first opening; 562. second opening; 563. third opening;

60. spoiler; 61. spoiler channel; 62. air outlet channel; 63. first surface; 64. second surface; 65. communication channel;

70. air outlet plate; 71. through hole; 80. air inlet conduit; and 90. shielding member.

DETAILED DESCRIPTION

The technical solutions in exemplary embodiments of the present disclosure will be described clearly and completely in combination with accompanying drawings in the exemplary embodiments of the present disclosure hereinafter. The exemplary embodiments described herein are merely for the purpose of illustration, and are not intended to limit the protection scope of the present disclosure. Therefore, it should be understood that various modifications and changes can be made to the exemplary embodiments without departing from the protection scope of the present disclosure.

In the description of the present disclosure, unless otherwise explicitly specified and defined, the terms "first" and "second" are merely for the purpose of description, and cannot be construed as indicating or implying relative importance; the term "a plurality of" refers to two or more; and the phrase "and/or" includes any or all combinations of one or more associated listed items. In particular, references to "the/said" object or "an" object are also intended to represent one of a plurality of such possible objects.

Unless otherwise specified or illustrated, the terms such as "connected" and "fixed" should be understood in a broad sense. For example, the term "connected" may be fixed connection, or detachable connection or integrated connection; or may be electrical connection or signal connection; or may be direct connection; or indirect connection via an intermediation. The specific meanings of the above terms in the present disclosure may be understood according to specific circumstances for those skilled in the art.

Further, in the description of the present disclosure, it should be understood that orientation words described in the exemplary embodiments of the present disclosure, such as "above", "below", "inside", and "outside" are described from view angles as shown in the drawings. and should not be construed as a limitation to the exemplary embodiments of the present disclosure. It should also be understood that in the context. when an element or feature is mentioned as being connected "above", "below", "inside", or "outside" other elements (one or more), the element may be not only directly connected "above", "below", "inside", or "outside" other elements (one or more), but also indirectly connected "above", "below", "inside", or "outside" other elements (one or more) via an intermediate element.

As shown in FIGS. 1 to 28, a cleaning system according to an embodiment of the present disclosure includes a dust collection pile 2 and a cleaning robot 1.

In the technical solutions provided in the embodiments of the present disclosure, the cleaning robot includes a robot body. The robot body may have an approximately circular shape, or may also have other shapes, including but not limited to an approximate D shape for which the front is square and the rear is circular.

The cleaning robot may further include a cleaning system, a perception system, a control system, a driving system, an energy system, a human-computer interaction system, etc. Various systems coordinate and cooperate with each other to enable the cleaning robot to move autonomously, thereby realizing a cleaning function. Functional elements and the like that constitute the respective systems described above in the cleaning robot may be integrated within the cleaning robot body. The cleaning robot body may include an upper cover, a chassis, and a middle frame disposed between the upper cover and the chassis. The middle frame may be used as a basic framework on which the respective functional elements are disposed. The upper cover and the chassis cover the surface of the device body, function to protect internal parts and components and may improve the aesthetics of the cleaning robot.

The perception system is used for the cleaning robot to perceive an external environment, such as terrain and a posture of the cleaning robot itself, and may provide various position information and motion state information about the robot to the control system of the cleaning robot.

In the technical solutions provided in the embodiments of the present disclosure, the perception system may include a position determining device including but not limited to an infrared transmitting and receiving device, a camera, and a laser distance sensor (LDS). The position determining device may be disposed at the top or on the side of the cleaning robot, and in the movement process of the cleaning robot, acquire a current position of the cleaning robot by determining a distance between the cleaning robot and a surrounding obstacle.

A buffer is used to buffer a collision between the robot body and a surrounding object during movement. A layer of soft rubber is disposed on the surface of the buffer, and the buffer is spaced from the device body by a predetermined distance when mounted to the device body, so as to ensure that the device body can have enough time to decelerate in case of collision.

The control system is disposed on a circuit main board within the robot body. It may be understood that the circuit main board is provided with various control circuits that control the running of the cleaning robot. The control system includes a non-transitory memory, a computing processor. etc. The computing processor may be a central processing unit, an application processor, etc., and the computing processor draws a real-time map of an environment where the cleaning robot is located by using a positioning algorithm according to obstacle information fed back by the laser distance sensor. In addition, in combination with distance information and speed information fed back by the buffer and a sensing device. a current operating state of the cleaning robot is comprehensively determined, such as crossing a doorsill, getting on a carpet, locating at a cliff, being stuck from above or below, having a full dust box, being picked up, etc., and a specific next action strategy may also be given for different situations, so that the work of the cleaning robot better meets requirements, thereby improving the user experience.

The human-computer interaction system may include a button on a host panel for a user to select functions, and the human-computer interaction system may further include a display screen and/or an indicator and/or a speaker for showing the user a current state of the robot or function selection options, and the human-computer interaction system may further include a mobile phone client application. The cleaning robot may show the user a map of the environment where the robot is located, the position where the cleaning robot is located, the state information about the cleaning robot, etc. through the mobile phone client application.

The energy system is used to provide electrical energy for the work of the functional elements of the respective systems, and the energy system mainly includes a rechargeable battery and a power supply circuit. The rechargeable battery may be a nickel hydrogen battery and a lithium battery. When the battery level of the rechargeable battery is lower than a predetermined minimum level, the rechargeable battery may be charged by connecting a charging electrode disposed on the side of the device body or below the device body with a charging device.

In addition, the cleaning robot further includes a cleaning mechanism, which is disposed on the robot body. The cleaning mechanism removes debris from a surface to be cleaned by interfering with the surface to be cleaned.

The cleaning mechanism includes a wet cleaning portion and a dry cleaning portion. The wet cleaning portion may be a flat mop, which is connected onto the robot body.

The dry cleaning portion may be a sweeping rolling brush, and sucks ground impurities into a dust box through a negative pressure generated by a fan with the cooperation of the sweeping rolling brush, the dust box, the fan, and the like. That is, the ground impurities enter the dust box through a garbage inlet of the robot body.

In the technical solutions provided in the embodiments of the present disclosure, the dust collection pile includes a body 10, a dust barrel 20, and a fan assembly 40.

As shown in FIGS. 2 to 6, the body 10 includes a dust inlet channel 11, where the dust inlet channel 11 has a dust inlet 111 which is used to be communicated with the dust box, so that dust within the dust box can enter the dust inlet channel 11 through the dust inlet 111.

Figure 6:
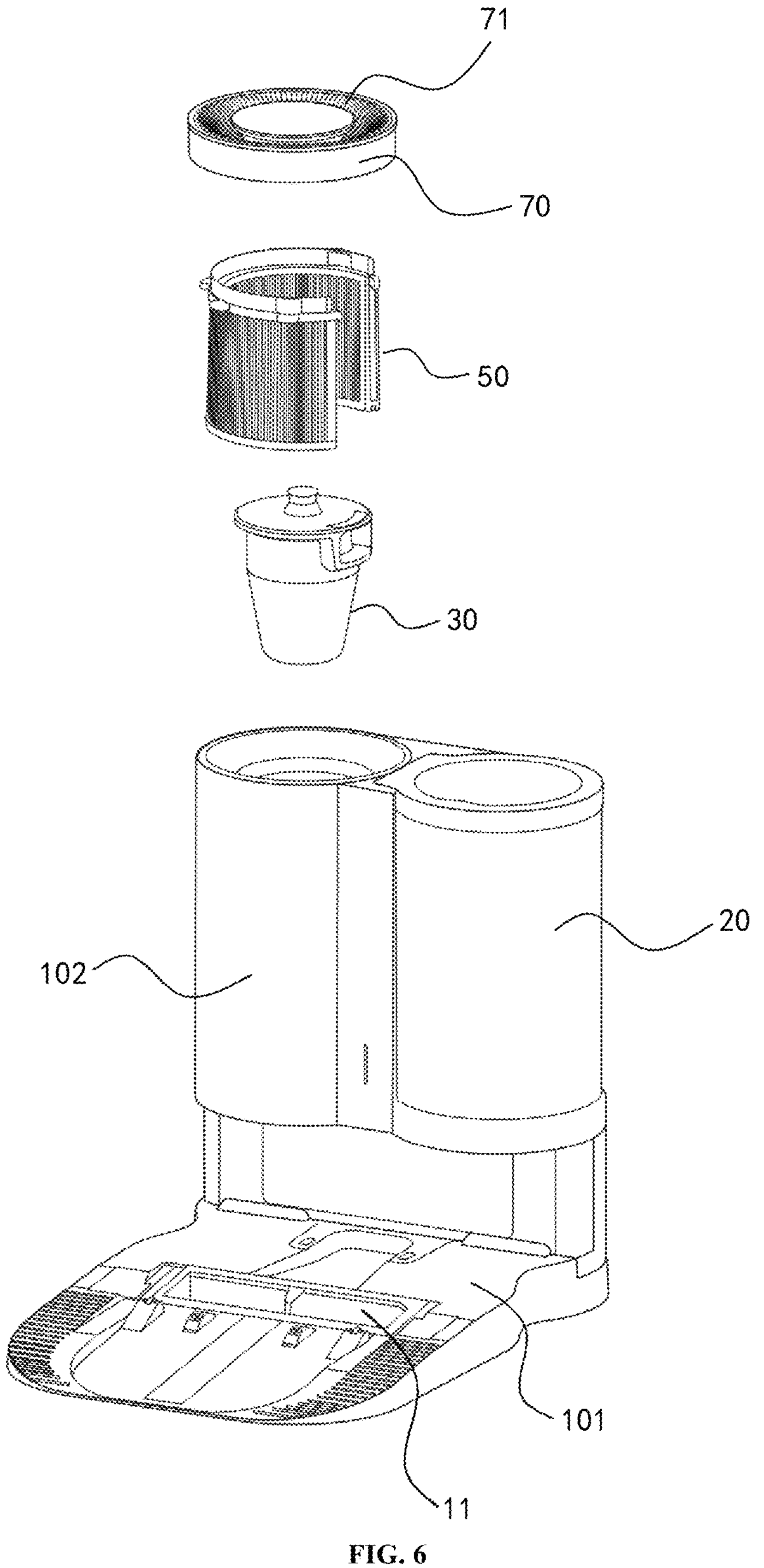
FIG. 6 is a schematic diagram of another disassembled structure of a dust collection pile shown according to an exemplary embodiment.
Figure 7:
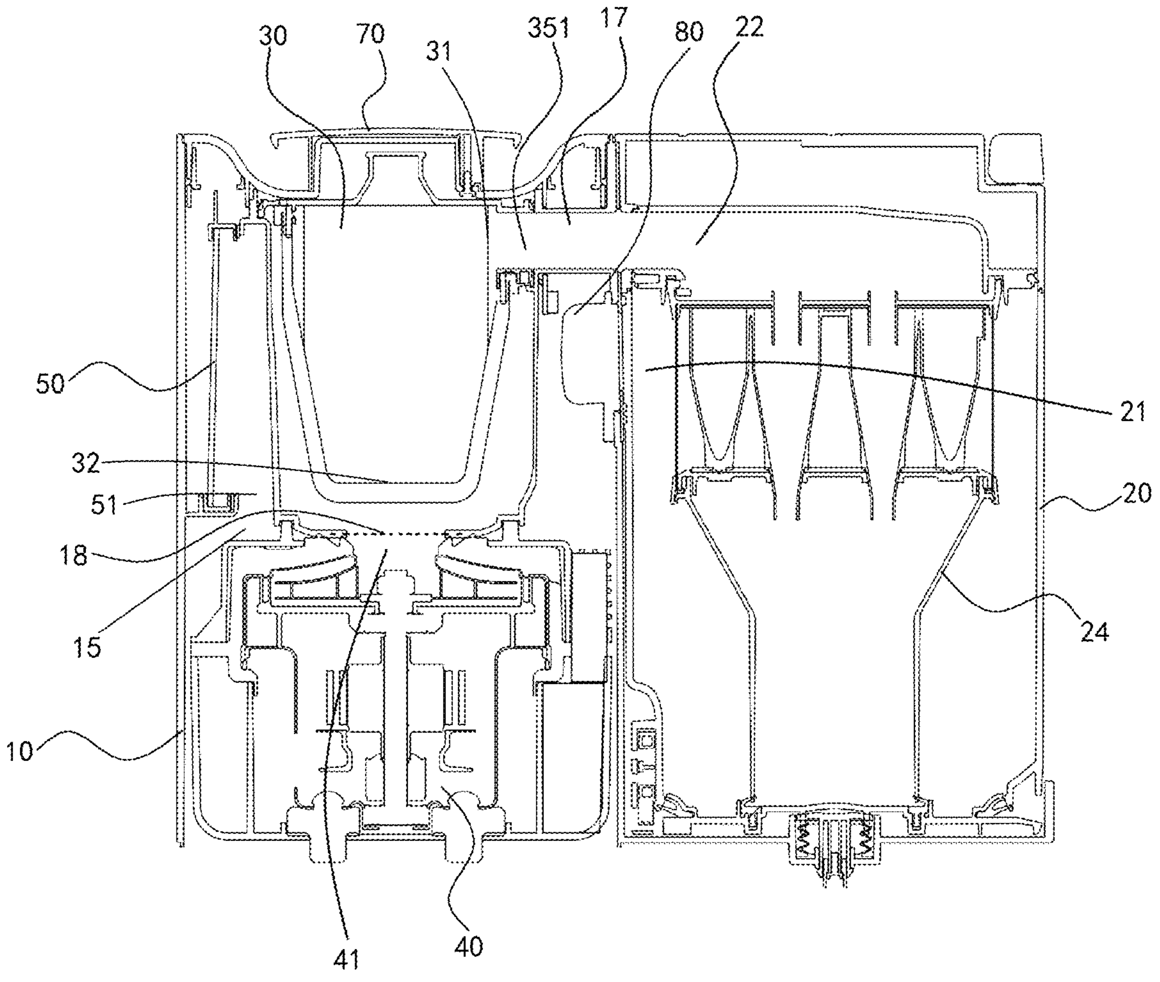
FIG. 7 is a schematic diagram of a sectional structure of a dust collection pile shown according to an exemplary embodiment.

As shown in conjunction with FIGS. 6 and 7, the dust barrel 20 is detachably disposed on the body 10, and a dust inlet end 21 of the dust barrel 20 is communicated with the dust inlet channel 11, so as to collect the dust entering from the dust inlet channel 11.

The fan assembly 40 is disposed on the body 10, where an air inlet 41 of the fan assembly 40 is communicated with an airflow outlet end 22 of the dust barrel 20, and the fan assembly 40 generates a negative pressure, so as to ensure that the dust within the dust box can enter the dust inlet channel 11 through the dust inlet 111 and allow airflows to circulate. Here, the dust within the dust box includes the debris within the dust box.

Specifically, when the cleaning robot moves to the body 10 and the garbage inlet of the cleaning robot is communicated with the dust inlet 111 of the dust inlet channel 11, the fan assembly 40 runs to form a seal between the garbage inlet of the cleaning robot and the dust inlet 111 of the dust inlet channel 11, so as to suck the dust within the dust box into the dust inlet channel 11.

After the cleaning robot moves in position, the dust collection pile in this embodiment can suck the dust within the dust box into the dust barrel 20 for collection through the running of the fan assembly 40, and finally, the airflows are discharged from the fan assembly 40, so that the dust within the dust box of the cleaning robot can be recycled into the dust barrel 20. Therefore, automated processing may be enabled for the whole dust cleaning process.

It should be noted that the dust barrel 20 is detachably disposed on the body 10, so as to facilitate cleaning and replacing of the dust barrel 20.

Figure 5:
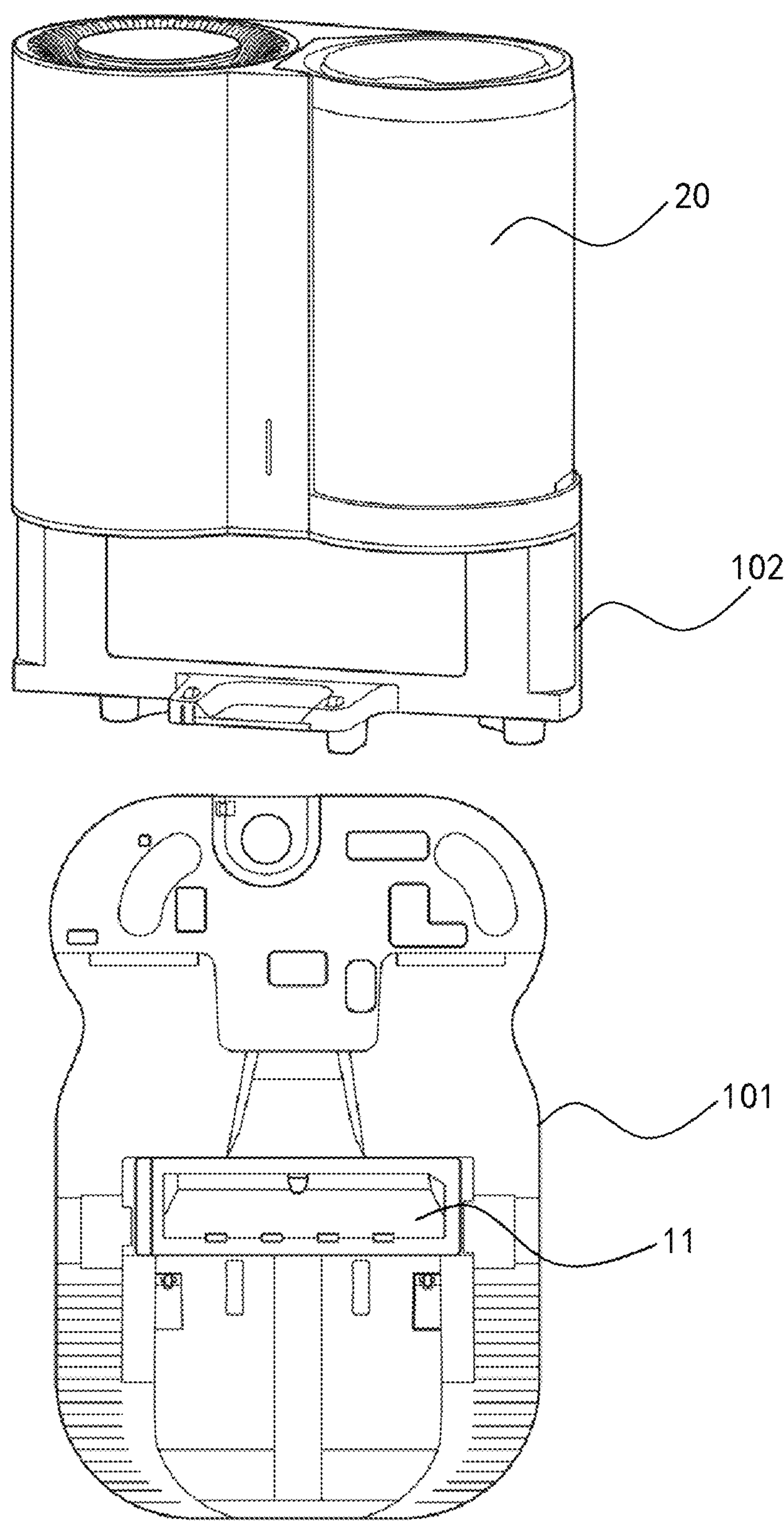
FIG. 5 is a schematic diagram of a disassembled structure of a dust collection pile shown according to an exemplary embodiment.

In an embodiment, as shown in FIGS. 5 and 6, the body 10 includes a base 101 and a mounting body 102. The dust inlet channel 11 is formed within the base 101. The dust inlet 111 is disposed on the top of the base 101. The cleaning robot moves to the base 101 to clean the dust.

The mounting body 102 is connected to the base 101, and an air inlet conduit 80 is provided within the mounting body 102. As shown in FIG. 7, the air inlet conduit 80) communicates the dust inlet channel 11 with the dust inlet end 21, so that the dust enters the dust barrel 20 from the dust inlet channel 11 through the air inlet conduit 80.

Optionally, the dust barrel 20 is detachably disposed on the mounting body 102. The fan assembly 40 is disposed on the mounting body 102.

The cleaning robot enters the base 101 from a front end of the base 101. and the mounting body 102 is disposed at a rear end of the base 101, so that there will be no collision or other issues with the mounting body 102 during the movement of the cleaning robot.

In some embodiments, the mounting body 102 and the base 101 may be of an integrated structure. Here, the integrated structure may be integrally formed, or may also refer to connecting and fixing two separate components to form an integral structure.

In some embodiments, the mounting body 102 is detachably connected to the base 101. That is, the mounting body 102 may be separated from the base 101 before use, so as to facilitate transportation and storage, etc., and the mounting body 102 is connected to the base 101 by means of connection in the related art such as a fastener or a clamp during use.

Optionally, the air inlet conduit 80 may be connected to the base 101, that is, the air inlet conduit 80 is connected to the base 101 after the mounting body 102 is separated from the base 101. Alternatively, the air inlet conduit 80 may be connected to the mounting body 102, that is, the air inlet conduit 80 is connected to the mounting body 102 after the mounting body 102 is separated from the base 101. Alternatively, the air inlet conduit 80 may be separated from the base 101 and the mounting body 102. In some embodiments, it is not excluded that the air inlet conduit 80 is integrated onto the base 101 or the mounting body 102.

Figure 8:
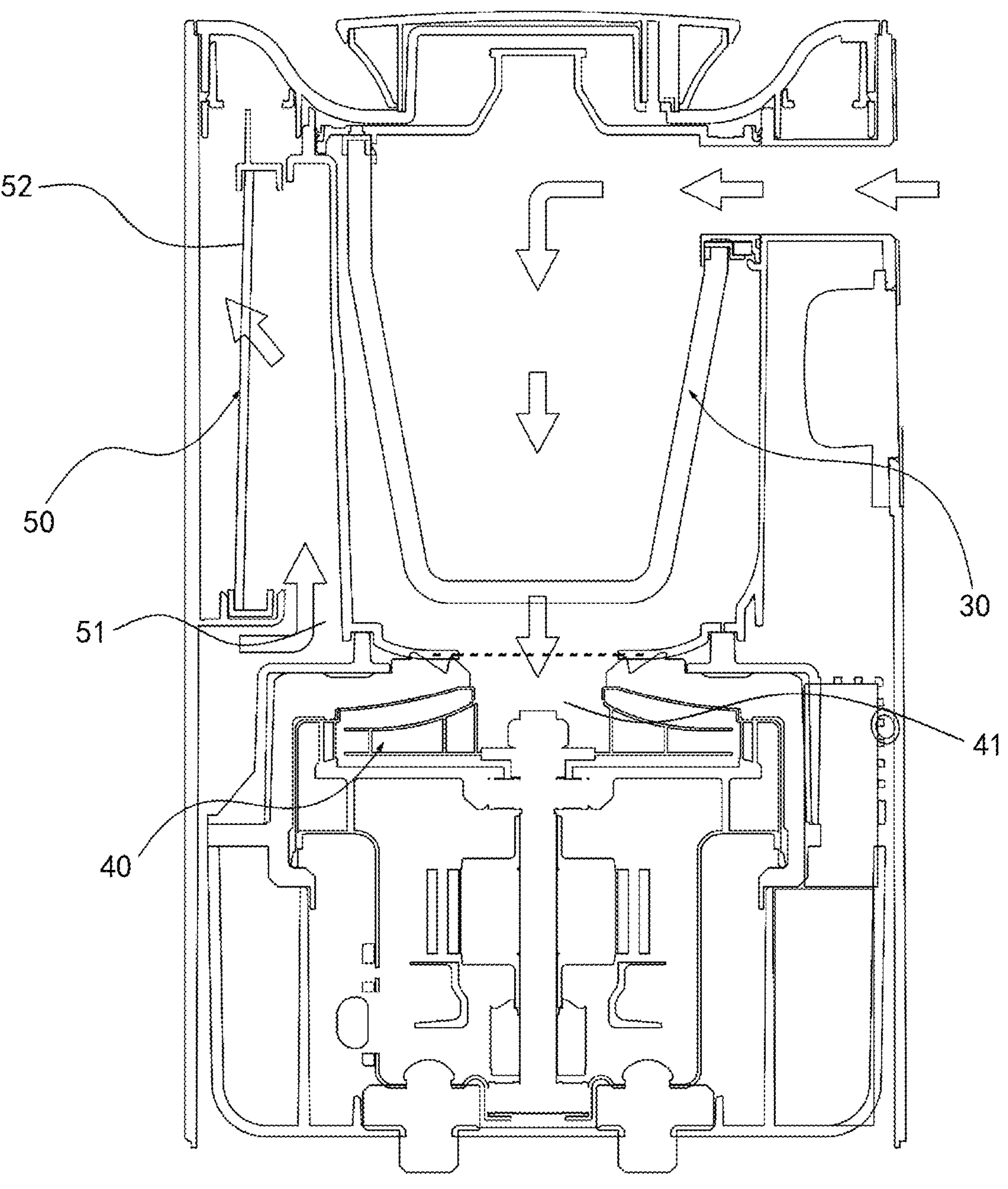
FIG. 8 is a schematic diagram of a partial sectional structure of a dust collection pile shown according to an exemplary embodiment.
Figure 9:
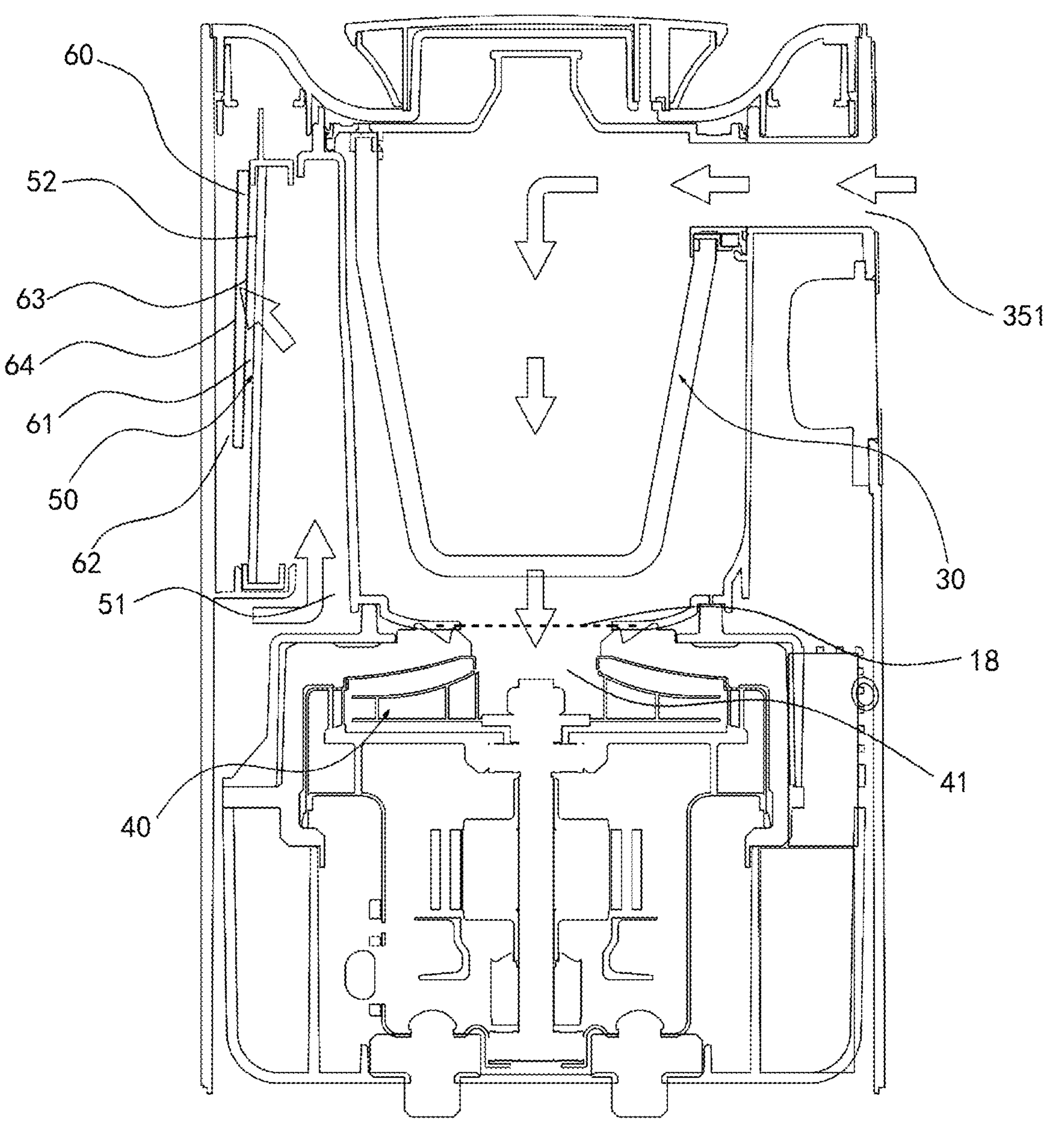
FIG. 9 is a schematic diagram of a partial sectional structure of a dust collection pile shown according to another exemplary embodiment.

In an embodiment, as shown in FIGS. 8 and 9, the dust collection pile further includes a filtering assembly 30. The filtering assembly 30 is disposed above the fan assembly 40.

The air inlet end 31 of the filtering assembly 30 is communicated with the airflow outlet end 22 of the dust barrel 20, so as to filter the airflows discharged through the dust barrel 20.

An air outlet end 32 of the filtering assembly 30 is communicated with the air inlet 41 of the fan assembly 40. When the cleaning robot moves to the body 10 and the garbage inlet of the cleaning robot is communicated with the dust inlet 111 of the dust inlet channel 11, the fan assembly 40 runs and generates a negative pressure at this time, which can suck the dust within the dust box into the dust barrel 20 for collection, and the airflows are filtered through the filtering assembly 30 before entering the fan assembly 40, thereby avoiding the dust from entering the interior of the fan assembly 40. Finally, the airflows are discharged from the fan assembly 40, so that the dust within the dust box of the cleaning robot is recycled into the dust barrel 20. Therefore, automated processing may be enabled for the whole dust cleaning process.

The filtering assembly 30 is located above the fan assembly 40. That is, the airflows discharged from the dust barrel 20 need to be filtered through the filtering assembly 30 first, and then flow into the air inlet 41 of the fan assembly 40 from the bottom of the filtering assembly 30, so that the distribution of a flowing path of the airflows is more reasonable, and it can be ensured that the distribution of components is more reasonable, thereby utilizing a height space effectively.

The filtering assembly 30 may be directly disposed on the body 10, or may also be directly disposed on the fan assembly 40.

In some embodiments, the filtering assembly 30 is disposed on the mounting body 102. That is, after the mounting body 102 is separated from the base 101, the dust barrel 20, the filtering assembly 30, and the fan assembly 40 may be all separated from the base 101 along with the mounting body 102.

Optionally, the filtering assembly 30 is detachably disposed on the mounting body 102, or may also be fixed onto the mounting body 102.

Figure 10:
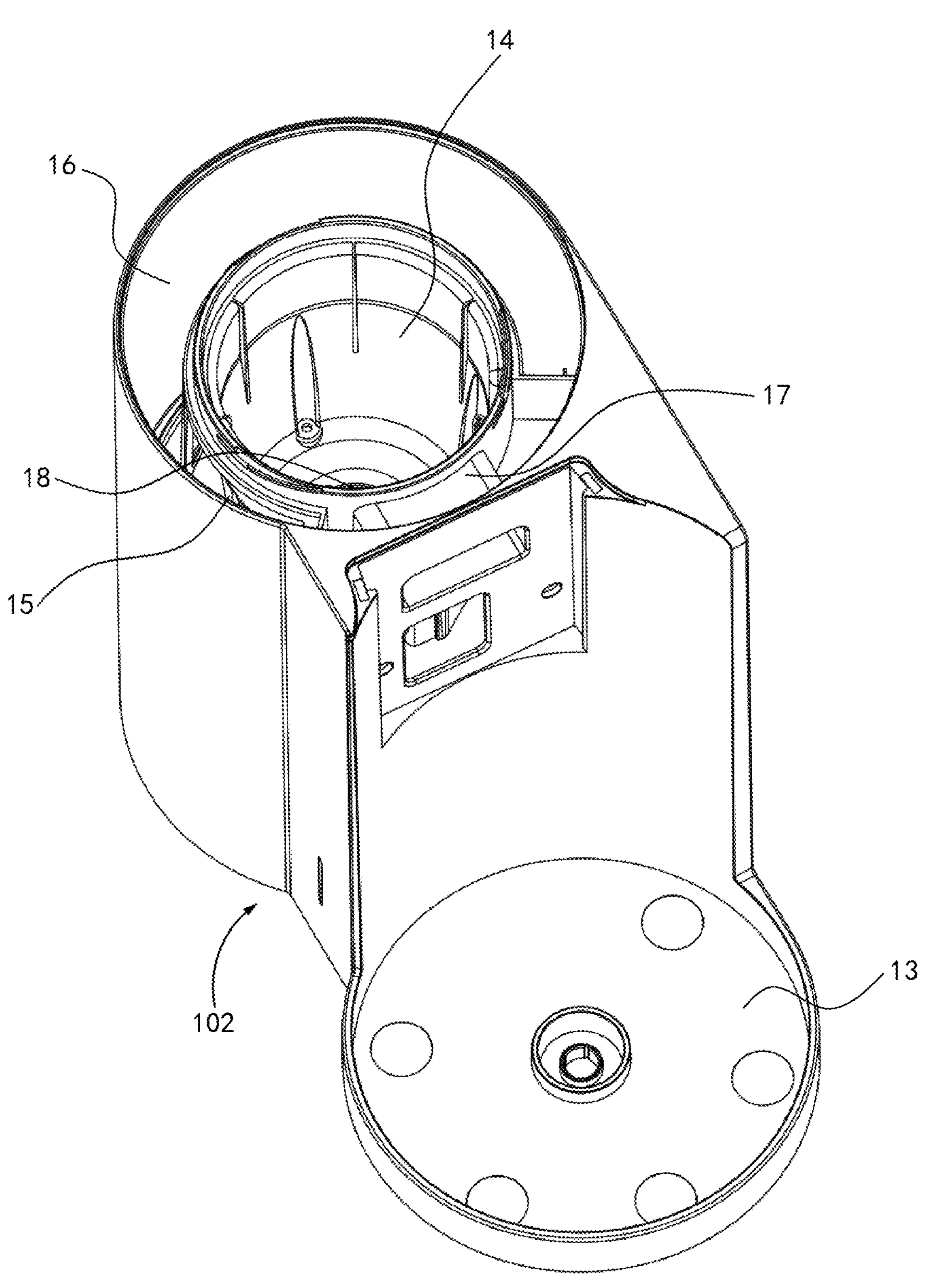
FIG. 10 is a schematic structural diagram of a mounting body of a dust collection pile shown according to an exemplary embodiment.

In an embodiment, as shown in FIG. 10, the body 10 further includes a first mounting portion 13 and a second mounting portion 14. The first mounting portion 13 and the second mounting portion 14 are respectively used to mount the dust barrel 20 and the filtering assembly 30. The first mounting portion 13 and the second mounting portion 14 are disposed on the mounting body 102.

A first detection member is disposed between the dust barrel 20 and the first mounting portion 13 and the first detection member is used for detecting whether the dust barrel 20 and the first mounting portion 13 are mounted in position. For example, when the dust barrel 20 and the first mounting portion 13 are mounted in position, the first detection member may send a first signal.

A second detection member is disposed between the filtering assembly 30 and the second mounting portion 14 and the second detection member is used for detecting whether the filtering assembly 30 and the second mounting portion 14 are mounted in position. For example, when the filtering assembly 30 and the second mounting portion 14 are mounted in position, the second detection member may send a second signal.

The dust collection pile further includes a control portion that is in signal connection with the first detection member or the second detection member. The control portion is in signal connection with the fan assembly 40, and the first detection member is in signal connection with the second detection member, so that the control portion cannot start the fan assembly 40 when at least one of the dust barrel 20 and the filtering assembly 30 is not mounted in position. That is, the first detection member and the second detection member are in a series relationship.

Therefore, the control portion can start the fan assembly 40 only when the first detection member sends the first signal and the second detection member sends the second signal. For example, the first detection member may be connected to a control end of the second detection member, while a signal transmitting end of the second detection member is connected to the control portion. If the control end of the second detection member cannot receive the first signal sent by the first detection member, the second detection member cannot send a starting signal (for example, the second signal) to the control portion even if the filtering assembly 30 and the second mounting portion 14 are mounted in position.

In this embodiment, the "or" relationship between in-position detection of the dust barrel 20 and in-position detection of the filtering assembly 30 can be implemented by connecting the first detection member with the second detection member in series. That is, if the dust barrel 20 is not in position. or the filtering assembly 30 is not in position, or both of them are not in position, the control portion may recognize them as being not in position (that is, the control portion determines that the dust collection pile is not mounted in position), so that electrical connection components and recognition components may be reduced.

In an embodiment, the dust barrel 20 is detachably connected to the first mounting portion 13, so as to facilitate the cleaning and replacing of the dust barrel 20.

It should be noted that the dust barrel 20 can be clamped with the first mounting portion 13. for example. through a coordination between a convex block and a slide, or the first mounting portion 13 is formed with a mounting groove, while at least a part of the dust barrel 20 is located within the mounting groove, which is not defined here and may be selected according to actual needs as long as it is ensured that they are easy to mount and will not fall off arbitrarily.

In an embodiment, the filtering assembly 30 is detachably connected to the second mounting portion 14, so as to facilitate the cleaning and replacing of the filtering assembly 30, thereby improving the filtering capability of the filtering assembly 30.

It should be noted that the filtering assembly 30 can be clamped with the second mounting portion 14, for example, through a coordination between a convex block and a slide, or the second mounting portion 14 is formed with a mounting groove, while at least a part of the filtering assembly 30 is located within the mounting groove, which is not defined here and may be selected according to actual needs as long as it is ensured that they are easy to mount and will not fall off arbitrarily. In this embodiment, the second mounting portion 14 has a mounting cavity. while the filtering assembly 30 is located within the mounting cavity. In addition, a sealed connection is formed between the upper portion of the filtering assembly 30 and the body 10, while a second channel 18 is disposed on the body 10. The second channel 18 communicates the air outlet end 32 of the filtering assembly 30 with the air inlet 41 of the fan assembly 40, so as to ensure that the airflows discharged through the filtering assembly 30 enter the air inlet 41 of the fan assembly 40 only through the second channel 18.

In an embodiment, the dust barrel 20 includes a dust bag 23 or a cyclone separator 24. The dust barrel 20 may collect garbage through the dust bag 23 or through the cyclone separator 24. The dust bag may be a paper bag or cloth bag with good air permeable and dust proof effects. as long as it is easy to replace.

It should be noted that the cyclone separator 24 may be one known in the related art. A working principle of the cyclone separator is a rotational movement caused by the tangential introduction of the airflows. When particles rotate at a high-speed in the airflows, a centrifugal force is much greater than the gravity. Since the higher the speed is, the greater the centrifugal settling speed obtained by the particles is when solid particles enter a conical cylinder from a tangential direction along with gas and rotate in the cylinder, the airflows collide with the wall of the cyclone separator and the particles hit the wall of a tube and descend in a rotary manner, thereby achieving the purpose of separating the solid from the gas. In this embodiment, the gas finally enters the air inlet end 31 of the filtering assembly 30 through the airflow outlet end 22 of the dust barrel 20.

Figure 11:
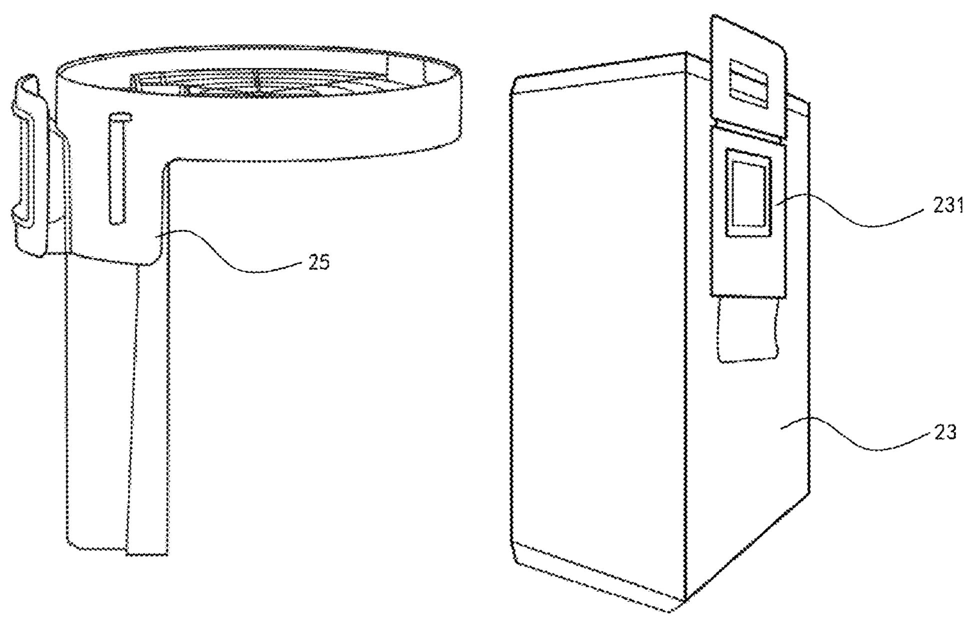
FIG. 11 is a schematic diagram of a disassembled structure of a dust bag and a dust bag transition device of a dust collection pile shown according to an exemplary embodiment.

Optionally, the dust barrel 20 mounted with the cyclone separator 24 may be mounted with the dust bag 23 through a dust bag transition device 25 to meet different requirements of the users. That is, the dust bag transition device 25 is similar to a support and mainly used to mount the dust bag 23 onto the dust barrel 20 and has a specific structure similar to a component of the cyclone separator 24 that is connected to the dust barrel 20, which is not limited here as long as it can be connected to the dust barrel 20, actually like a component provided by imitating a connection structure of the cyclone separator 24. Optionally, the dust bag 23 may be provided with a transition portion 231 for being connected to the dust bag transition device 25, which is specifically as shown in FIG. 11.

In an embodiment, the first mounting portion 13 is selectively mounted with the dust barrel 20 including the dust bag or the dust barrel 20 including the cyclone separator. That is, an external structure of the dust barrel 20 may be of a general structure, a structure connected to the first mounting portion 13 may be a uniform structure, while the dust bag or the cyclone separator may be disposed inside the dust barrel 20, so that the first mounting portion 13 may be selectively mounted with the dust barrel 20 including the dust bag or the dust barrel 20 including the cyclone separator.

In an embodiment, the first mounting portion 13 and the second mounting portion 14 are spaced apart from each other, so that the dust barrel 20 or the filtering assembly 30 can be mounted on the body 10 first, or the dust barrel 20 and the filtering assembly 30 can be mounted on the body 10 simultaneously. That is, the dust barrel 20 and the filtering assembly 30 are mounted without a limitation on a mounting sequence, and may be mounted and detached arbitrarily as required, without interference between the components, thereby simplifying the structures and facilitating the mounting.

The first mounting portion 13 and the second mounting portion 14 may be distributed on two sides of the base 101 sequentially. In addition, two structures similar in appearance are formed above the base 101 after the dust barrel 20 is mounted to the first mounting portion 13, while the filtering assembly 30 is mounted inside the first mounting portion 13.

In an embodiment, the first detection member is a contact detection element or a non-contact detection element, and the second detection member is a contact detection element or a non-contact detection element.

Specifically, the first detection member may include a contact switch sensing element and a contact switch fitting element, and the second detection member may include a non-contact sensing element and a non-contact sensing and fitting element. The first mounting portion 13 is provided with a contact switch sensing element, and the dust barrel 20 is provided with a contact switch fitting element. The contact switch sensing element may be fitted with the contact switch fitting element when the dust barrel 20 is mounted to the first mounting portion 13, so that the contact switch fitting element can sense the contact switch sensing element. The second mounting portion 14 is provided with a non-contact sensing element, and the filtering assembly 30 is provided with a non-contact sensing and fitting element. The non-contact sensing and fitting element may be fitted with the non-contact sensing element when the filtering assembly 30 is mounted to the second mounting portion 14, so that the non-contact sensing and fitting element can sense the non-contact sensing element.

It should be noted that the contact detection elements may be contact sensors in the related art, such as pressure sensors and switch elements, and the non-contact detection elements may be non-contact sensors in the related art, such as laser sensors and inductive proximity sensors.

Figure 12:
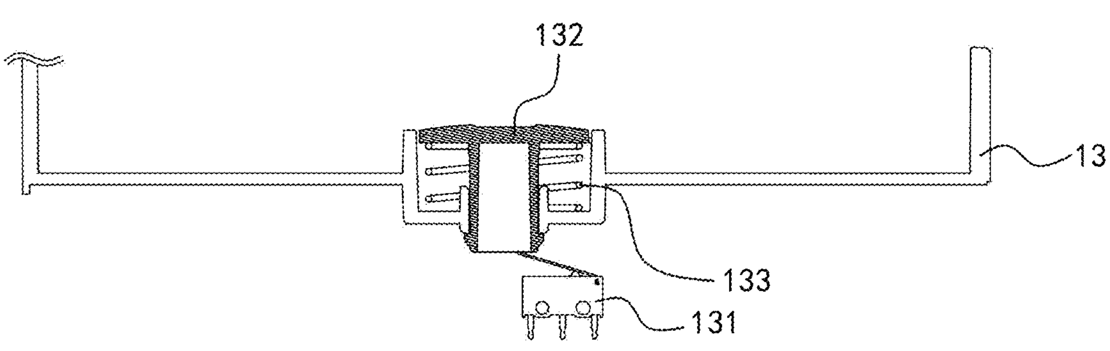
FIG. 12 is a schematic diagram of a state structure of a contact detection element of a dust collection pile shown according to an exemplary embodiment.
Figure 13:
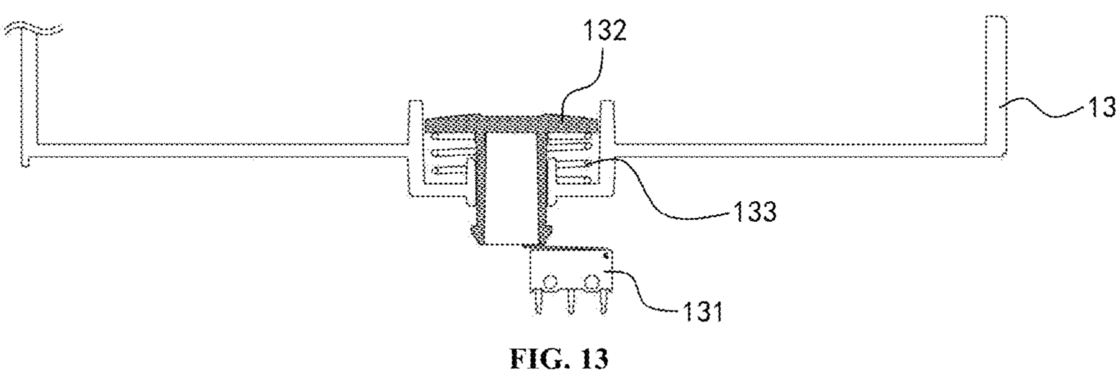
FIG. 13 is a schematic diagram of another state structure of a contact detection element of a dust collection pile shown according to an exemplary embodiment.

In some embodiments, as shown in FIGS. 12 and 13, the contact detection element includes a switch 131 disposed on the first mounting portion 13; and a detection button 132 disposed opposite to the switch 131, so that the detection button 132 presses the switch 131 to be in a closed state when the dust barrel 20 and the first mounting portion 13 are mounted in position, that is, after the dust barrel 20 is mounted in position, the switch 131 is in a closed state, so as to output corresponding signals.

The switch 131 may be a conventional button, which is connected on a line, and the button can be turned on only when the detection button 132 presses in position, so as to achieve the conduction of the line, thereby enabling signal transmission.

Optionally, the detection button 132 may be disposed on the dust barrel 20.

Optionally, the contact detection element further includes an elastic member 133, where the elastic member 133 is disposed on the first mounting portion 13, and the detection button 132 is inserted into the elastic member 133. The elastic member 133 is located between the detection button 132 and the first mounting portion 13, so that the elastic member 133 drives the detection button 132 to release the switch 131 when the dust barrel 20 is disengaged from the first mounting portion 13, so as to allow the switch 131 to be in an open state. The detection button 132 may be disposed on the first mounting portion 13 and moves downward depending on a pressure of the dust barrel 20. In addition, when the dust barrel 20 is disengaged from the first mounting portion 13 upward, the detection button 132 may move upward under the driving of the elastic member 133, so as to release the switch 131. The detection button 132 is provided with a position-limiting structure at the bottom end, thereby avoiding the detection button 132 from being disengaged from the first mounting portion 13.

In some embodiments, the switch 131 is disposed on the second mounting portion 14, and the detection button 132 is disposed opposite to the switch 131, so that the detection button 132 presses the switch 131 to be in the closed state when the filtering assembly 30 and the second mounting portion 14 are mounted in position. That is, after the filtering assembly 30 is mounted in position, the switch 131 is in the closed state, so as to output the corresponding signals.

Optionally, the detection button 132 may be disposed on the filtering assembly 30.

Optionally, the detection button 132 is disposed on the second mounting portion 14, the elastic member 133 is disposed on the second mounting portion 14, and the detection button 132 passes into the elastic member 133. The elastic member 133 is located between the detection button 132 and the second mounting portion 14, so that the elastic member 133 drives the detection button 132 to release the switch 131 when the filtering assembly 30 is disengaged from the second mounting portion 14, so as to allow the switch 131 to be in the open state. In some embodiments, the elastic member 133 may be a spring.

Figure 14:
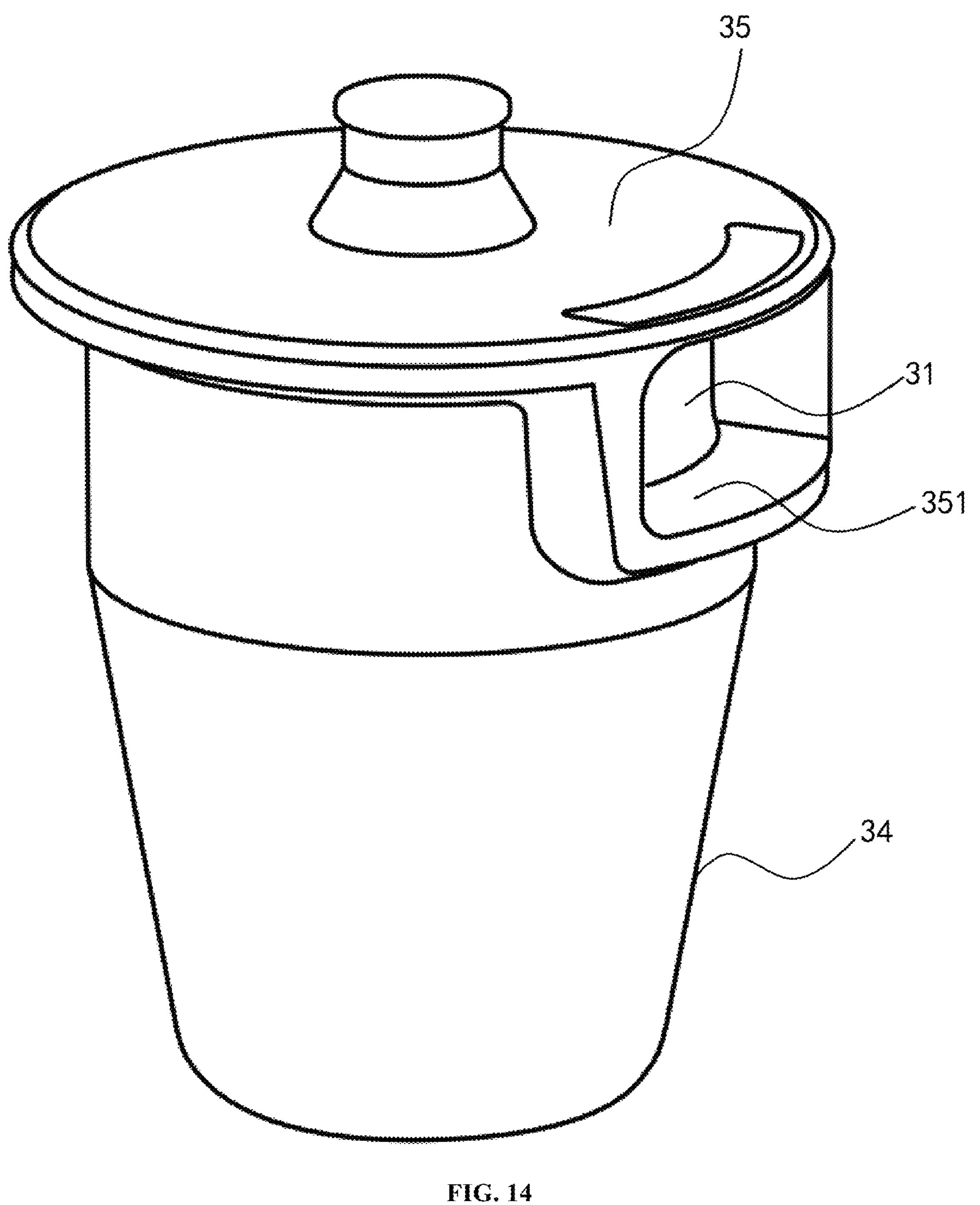
FIG. 14 is a schematic structural diagram of a filtering assembly of a dust collection pile shown according to an exemplary embodiment.
Figure 15:
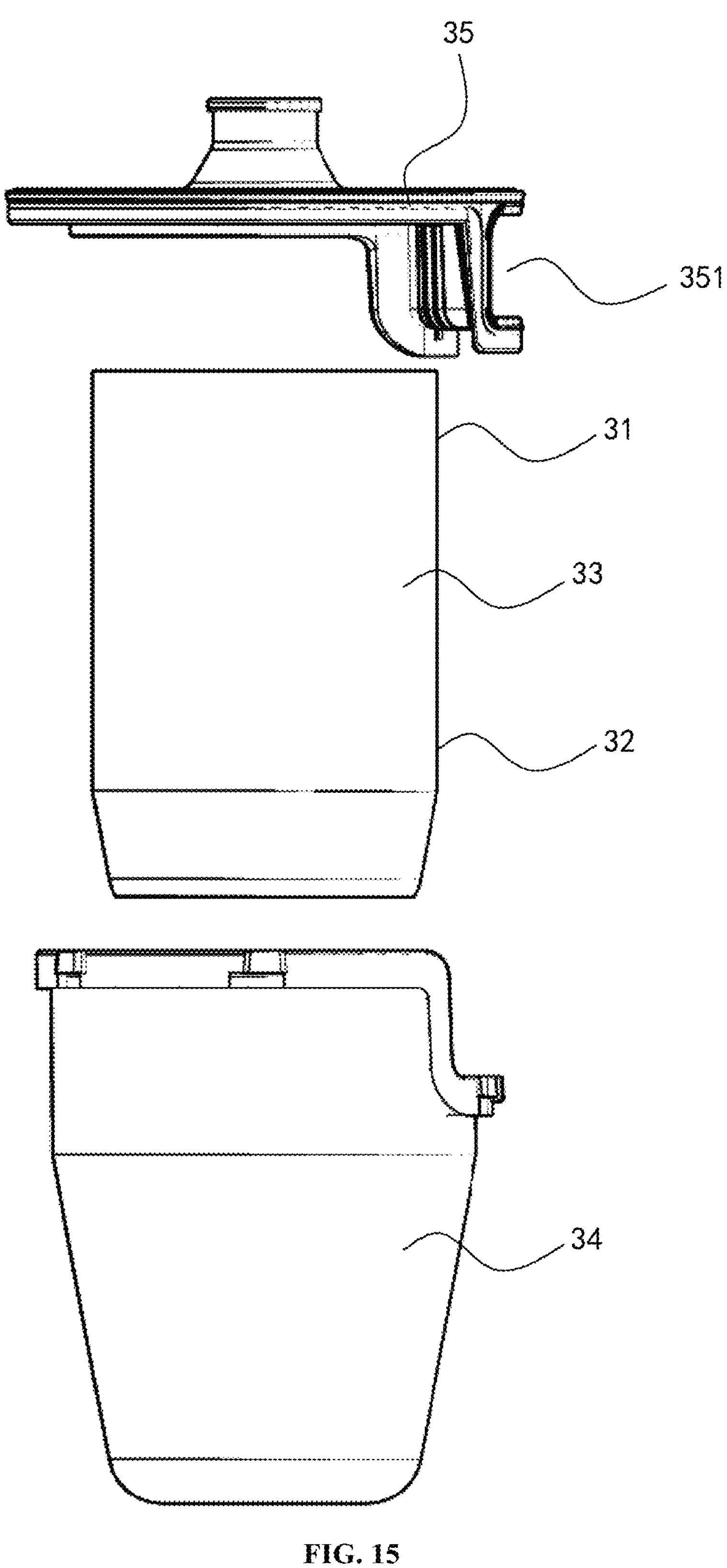
FIG. 15 is a schematic diagram of a disassembled structure of a filtering assembly of a dust collection pile shown according to an exemplary embodiment.

In an embodiment, as shown in FIGS. 14 and 15, the filtering assembly 30 includes a top cover 35 having an air inlet channel 351, where the air inlet channel communicates the air inlet end 31 with a communication pipeline 17; and a filtering portion 34 disposed on the top cover 35 and disposed opposite to the air outlet end 32, so that the dust is filtered through the filtering portion 34, thereby avoiding the dust from entering the fan assembly 40.

Optionally, the filtering portion 34 may be of a filtering structure in the related art, such as a filter screen structure. A specific structure form may be, for example, a circular network structure, thereby enabling the filtering of the dust.

Optionally, as shown in FIG. 15, the filtering portion 34 is of a bag structure. That is, a filtering area of the filtering portion 34 increases, and a filtering contact area increases, so as to improve the filtering effect. Moreover, the service life of the filtering portion 34 may be greatly prolonged due to the increase in the filtering area, thereby reducing a replacing frequency of the filtering portion 34.

It should be noted that the bag structure may be connected so that the filtering portion 34 has an accommodation space. The airflows enter the accommodation space and are then discharged from the filtering portion 34.

As shown in conjunction with FIG. 15, the filtering assembly 30 further includes a dust containing member 33, where the dust containing member 33 has an air inlet end 31 and an air outlet end 32. The dust containing member 33 is disposed within the filtering portion 34, and the filtering portion 34 is disposed opposite to the air outlet end 32, so that the airflows discharged through the air outlet end 32 enter the air inlet 41 of the fan assembly 40 after passing through the filtering portion 34. The dust containing member 33 can absorb the dust within the airflows, thereby achieving primary absorption of the dust within the airflows. and avoiding a large amount of dust from entering the filtering portion 34 to block the filtering portion 34.

In an embodiment, the dust containing member 33 includes dust containing cotton. After entering the filtering assembly 30, the airflows may pass through the dust containing cotton first. The dust containing cotton cannot intercept all the dust within specifications, but can intercept some of larger particles to reduce the risk that the filtering portion 34 is blocked, thereby prolonging the service life of the whole filtering assembly 30.

Optionally, the dust containing member 33 includes sponge. The filtering portion 34 may be a filter screen, which may include filtering cotton.

In an embodiment, as shown in FIG. 15, both the air inlet end 31 and the air outlet end 32 are located on an outer surface of the dust containing member 33, and an area of the air inlet end 31 is less than an area of the air outlet end 32, so that the airflows can enter the dust containing member 33 from a relatively small surface to increase the length of a path that the airflows pass through the dust containing member 33, thereby increasing the absorption amount of the dust and further reducing the impact of the dust on the filtering portion 34.

In an embodiment, the filtering portion 34 encloses the dust containing member 33, so that the filtering portion 34 can not only implement the fixation of the dust containing member 33, but also allow the airflows flowing out of the dust containing portion 33 to be discharged directly through the filtering portion 34, thereby ensuring the filtering effect and simplify the structure.

In an embodiment, the dust containing member 33 and the filtering portion 34 are disposed on the top cover 35, so that the dust containing member 33 and the filtering portion 34 are fixed on the top cover 35.

Specifically, the top cover 35 of the filtering assembly 30 may be connected to the body 10, so as to dispose the filtering assembly 30 on the body 10.

Optionally, at least one of the dust containing member 33 and the filtering portion 34 may be directly fixed on the top cover 35, that is, the dust containing member 33 may be connected to the top cover 35, while the filtering portion 34 may enclose the dust containing member 33. That is, the filtering portion 34 is connected to the dust containing member 33, and may not be connected to the top cover 35 directly.

Optionally, the filtering portion 34 is connected to the top cover 35 to form an accommodation space between the filtering portion 34 and the top cover 35, and the dust containing member 33 is located within the accommodation space. That is, the dust containing member 33 is fixed within the accommodation space formed between the filtering portion 34 and the top cover 35.

In an embodiment, the filtering portion 34 is detachably disposed on the top cover 35, so as to facilitate replacing the filtering portion 34 and the dust containing member 33. The filtering portion 34 and the top cover 35 may be clamped, adhered or connected by a fastener, which is not limited here as long as they are easy to be detached and mounted.

In an embodiment, an area of the top cover 35 covering the dusting containing member 33 is less than an area of the filtering portion 34 covering the dust containing member 33, so that the air inlet end 31 of the dust containing member 33 is smaller than the air outlet end 32. thereby ensuring that the airflows flow out rapidly, and the dust containing member 33 implements absorption of the dust to the maximum extent.

Figure 16:
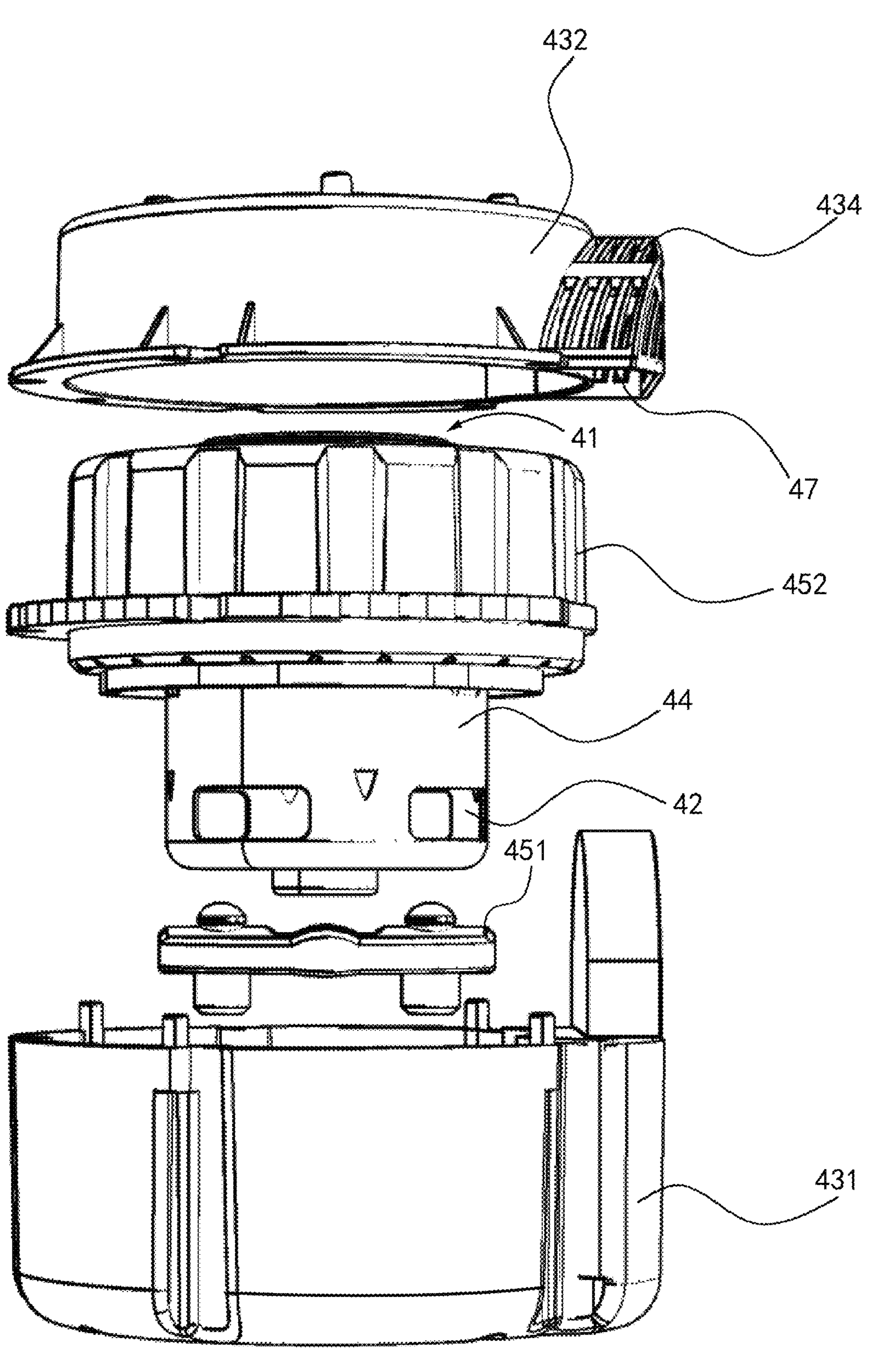
FIG. 16 is a schematic diagram of a disassembled structure of a fan assembly of a dust collection pile shown according to an exemplary embodiment.
Figure 17:
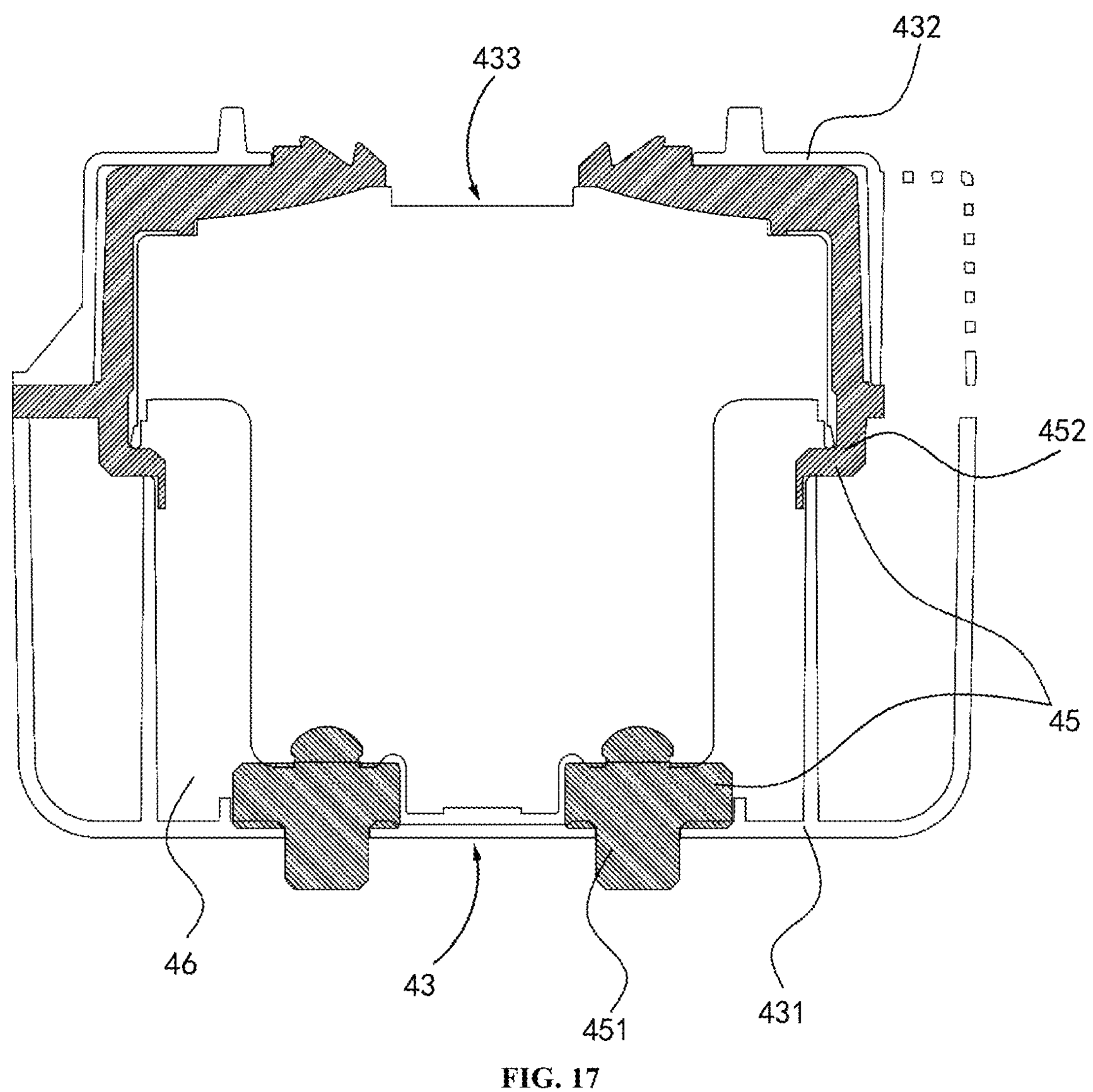
FIG. 17 is a schematic diagram of a sectional structure of a fan assembly of a dust collection pile shown according to an exemplary embodiment.

In an embodiment, as shown in FIGS. 16 and 17, the fan assembly 40 includes a housing 43, a fan 44, and a flexible member 45.

The housing 43 is disposed on the body 10. The flexible member 45 is located between the housing 43 and the fan 44. The fan 44 is fixed within the housing 43 by the flexible member 45, and the flexible member 45 avoids a direct contact between the fan 44 and the housing 43. The arrangement of the flexible member 45 may avoid the direct contact between the fan 44 and the housing 43, so as to avoid large noise. In addition, since the fan 44 is fixed within the housing 43 by the flexible member 45, the housing 43 may be enabled to adapt to the fans 44 of different types as long as the flexible member 45 is replaced, so as to improve the generality of the housing 43.

Specifically, a mounting cavity is formed in the body 10. Both the fan assembly 40 and the filtering assembly 30 are disposed within the mounting cavity, and a partition plate is disposed between the fan assembly 40 and the filtering assembly 30. A second channel 18 is disposed on the partition plate. The second channel 18 communicates the air outlet end 32 of the filtering assembly 30 with the air inlet 41 of the fan assembly 40, so as to ensure that the airflows discharged through the filtering assembly 30 enter the air inlet 41 of the fan assembly 40 only through the second channel 18, which is specifically as shown in FIGS. 9 and 10. The body 10 implements the protection of the fan assembly 40 and the filtering assembly 30, and avoids the fan assembly 40 and the filtering assembly 30 from being exposed to an external environment.

In an embodiment, as shown in FIGS. 16 and 17, the housing 43 includes a first housing member 431; and a second housing member 432, where the second housing member 432 is detachably connected to the first housing member 431 to release or fix the fan 44 and the flexible member 45, which facilitates not only the mounting of the fan 44 and the flexible member 45 but also subsequent maintenance and replacement. In addition, the fans 44 of different types may be selected to replace the fans 44 of the original type, and only does the flexible member 45 need to be adaptively replaced, thereby achieving the generality of the housing 43.

In some embodiments, the second housing member 432 is connected to the first housing member 431 in a sealed manner, and the second housing member 432 may be connected to the first housing member 431 through a plurality of fasteners.

In an embodiment, as shown in FIG. 17, the flexible member 45 includes a first flexible portion 451 disposed between the fan 44 and the first housing member 431 to support the fan 44; and a second flexible portion 452, where at least a part of the second flexible portion 452 is disposed between the fan 44 and the second housing member 432 to clamp the fan 44 together with the first flexible portion 451. The second flexible portion 452 can be filled between the fan 44 and the second housing member 432, so as to avoid the fan 44 from moving relative to the second housing member 432 and ensure that the fan 44 is fixed within the second housing member 432. The first flexible portion 451 can be filled between the fan 44 and the first housing member 431, so as to avoid the fan 44 from moving relative to the first housing member 431 and ensure that the fan 44 is fixed within the first housing member 431. The first flexible portion 451 and the second flexible portion 452 implement the fixation of the fan 44 and completely avoid a hard contact between the fan 44 and the housing 43.

Optionally, the first flexible portion 451 may be connected to the second flexible portion 452.

Optionally, the first flexible portion 451 is disposed separately from the second flexible portion 452. That is, during specific mounting, the first flexible portion 451 and the fan 44 may be disposed within the first housing member 431 first, and then, the second flexible portion 452 and the second housing member 432 are fastened onto the fan 44 and the first housing member 431, and the second housing member 432 and the first housing member 431 are fixed, so as to complete the mounting of the fan assembly 40.

In an embodiment, a part of the second flexible portion 452 is clamped between the first housing member 431 and the second housing member 432 to seal a gap between the first housing member 431 and the second housing member 432, so as to prevent the first housing member 431 and the second housing member 432 from being sealed by using other sealing members, which is simple in structure and may reduce mounting steps.

In an embodiment, the first flexible portion 451 is a rubber mat, and the second flexible portion 452 is a rubber sleeve. The rubber mat is supported between the fan 44 and the first housing member 431, while the rubber sleeve is sleeved over an upper portion of the fan 44, so as to protect the fan 44.

In an embodiment, the second housing member 432 is provided with an airflow through hole 433. The airflow through hole 433 is communicated with the air inlet 41 of the fan 44. and there is a clearance between the first housing member 431 and the fan 44. An air discharging channel 46 is formed among the first flexible portion 451, the second flexible portion 452, the first housing member 431, and the fan 44, and the air discharging channel 46 is communicated with the air outlet 42 of the fan 44. The airflows discharged from the filtering assembly 30 enter the air inlet 41 of the fan 44 through the airflow through hole 433, discharged into the air discharging channel 46 through the air outlet 42 of the fan 44, and finally discharged from the air discharging channel 46, so as to achieve the circular flowing of the airflows.

Figure 18:
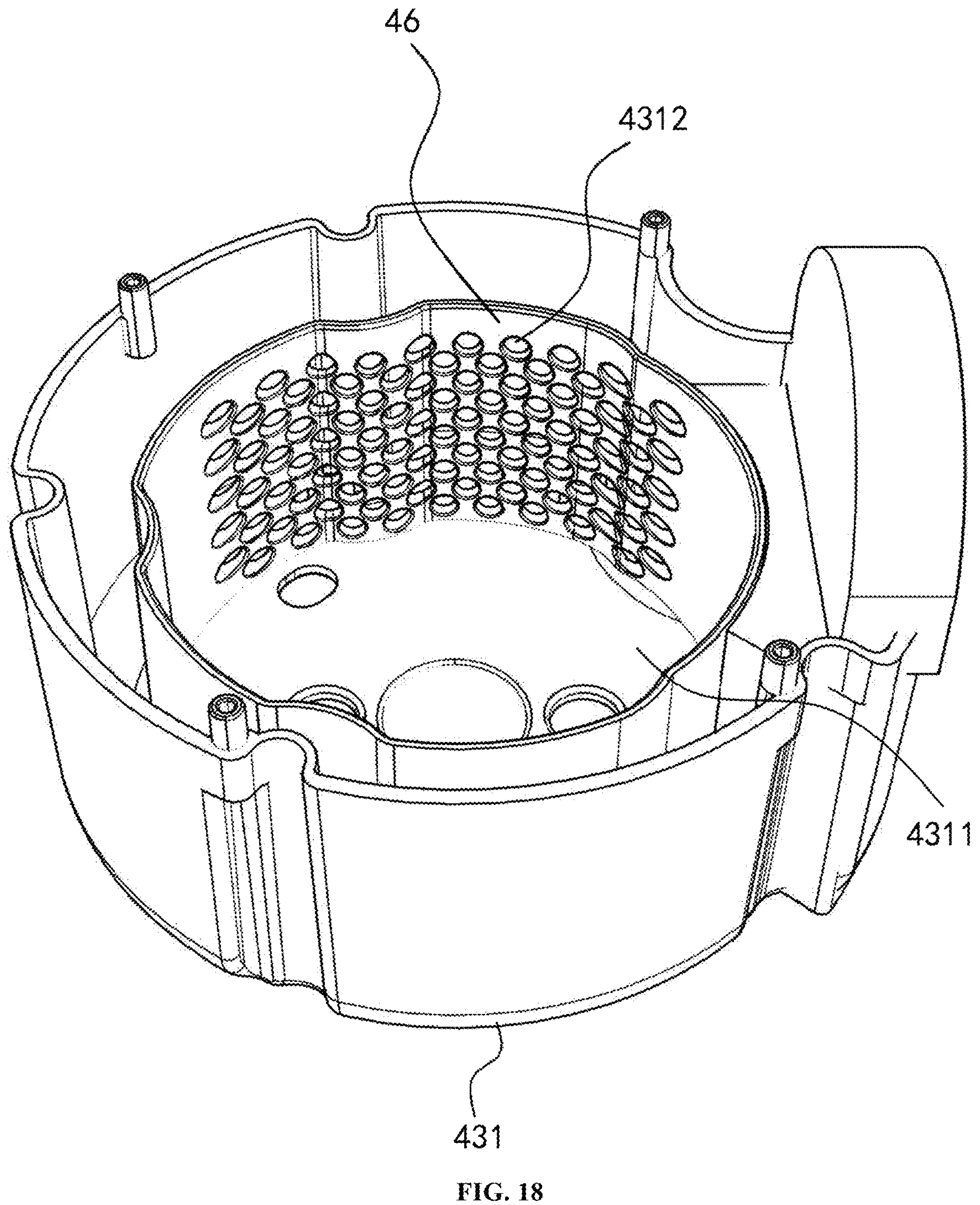
FIG. 18 is a schematic structural diagram of a first housing member of a fan assembly of a dust collection pile shown according to an exemplary embodiment.

As shown in FIG. 18, the first housing member 431 has a space 4311 accommodating the fan 44, and a plurality of wind holes 4312 is formed on a side wall of the space 4311. That is, the airflows within the air discharging channel 46 are discharged through the wind holes 4312. and the wind holes 4312 occupy a part of the first housing member 431 in a circumferential direction, so that the circular flowing of the airflows within the air discharging channel 46 may be achieved. The first housing member 431 has an inside housing member and an outside housing member which are sleeved on both inner and outer sides. An airflow space formed between the inside housing member and outside housing member which are sleeved on both inner and outer sides is communicated with the air discharging channel 46 through the wind holes 4312, and finally discharged from the fan assembly 40.

In an embodiment, the fan assembly 40 further includes an air discharging hole 434. The air discharging hole 434 is communicated with the air discharging channel 46, so as to discharge the airflows within the air discharging channel 46 out of the fan assembly 40.

Optionally, the air discharging hole 434 is formed in the housing 43, so as to discharge the airflows within the air discharging channel 46. Specifically, the air discharging hole 434 may be formed in the first housing member 431, that is, the airflows within the air discharging channel 46 may be discharged from the fan assembly 40 without punching a hole in the second flexible portion 452. The air discharging hole 434 may also be formed in the second housing member 432, that is, a hole may be formed in the second flexible portion 452 to communicate the air discharging hole 434 with the air discharging channel 46. Specific position of the air discharging hole 434 may not be defined, as long as it is ensured that the airflows can be discharged out of the air discharging channel 46.

In an embodiment, as shown in FIG. 16, the fan assembly 40 further includes a silencer 47. The silencer 47 is disposed on the housing 43. An inlet of the silencer 47 is communicated with the air discharging hole 434, or an outlet of the silencer 47 is communicated with the air discharging hole 434. Therefore, the airflows discharged out of the air discharging channel 46 are silenced through the silencer 47, so as to reduce noise caused by the airflows.

Optionally, the silencer 47 may be disposed inside the housing 43. The air discharging channel 46 is communicated with the inlet of the silencer 47. The outlet of the silencer 47 may be communicated with the air discharging hole 434, so that the airflows pass through the silencer 47 first and are then discharged out of the housing 43.

Optionally, the silencer 47 may be disposed outside the housing 43. The air discharging channel 46 is communicated with the air discharging hole 434. The air discharging hole 434 is communicated with the inlet of the silencer 47, so that the airflows are discharged out of the housing 43 first, and then silenced by the silencer 47.

In an embodiment, the air discharging channel 46 is disposed around a circumferential outer surface of the fan 44, and the length of the air discharging channel 46 extending along the circumferential outer surface of the fan 44 is greater than the length of the air discharging hole 434 extending along the circumferential outer surface of the fan 44. That is, the airflows discharged from the fan 44 are discharged out of the housing 43 only from a relatively fixed position, so that the airflows may rotate within the air discharging channel 46 for nearly one revolution. and are then discharged from the air discharging hole 434. As such, noise may be reduced by extending an airflow path.

Specifically, air outlets 42 may be formed on the circumferential outer surface of the fan 44 by nearly one revolution, and the air discharging channel 46 also forms a surrounding space for nearly one revolution at this point, so that airflows from the air outlets 42 at respective positions can be directly discharged into the air discharging channel 46, and at this point, the air discharging hole 434 on the housing 43 may be located in a circumferential direction of the housing 43. The air discharging hole 434 on the housing 43 may also be formed on top of the housing 43, and at this point, the air discharging channel 46 may be communicated with the air discharging hole 434 through a pipeline, so as to ensure that the airflows discharged from the air discharging channel 46 need to be rotated to a relatively fixed position for discharge, thereby reducing noise by increasing the airflow paths.

In an embodiment, as shown in FIGS. 7 to 9, the dust collection pile further includes a filtering element 50. The filtering element 50 is disposed around the filtering assembly 30, and an air collecting port 51 of the filtering element 50 is communicated with the air outlet 42 of the fan assembly 40. That is, the airflows discharged from the air outlet 42 of the fan assembly 40 need to be filtered first through the filtering element 50 and then discharged, thereby ensuring that the discharged airflows are clean.

In some embodiments, the filtering element 50 may be of a conventional filtering structure, that is, may include a filter screen, so as to achieve secondary filtering of the airflow and ensure that the discharged airflows are clean. For example, the filtering element 50 may be of an annular structure, namely, a circumferential closed structure, so as to be disposed around the filtering assembly 30. The airflows enter the fan assembly 40 from the filtering assembly 30. that is, flow from top to bottom; and then, the airflows enter the filtering element 50 from the fan assembly 40, that is, flow from bottom to top.

Figure 19:
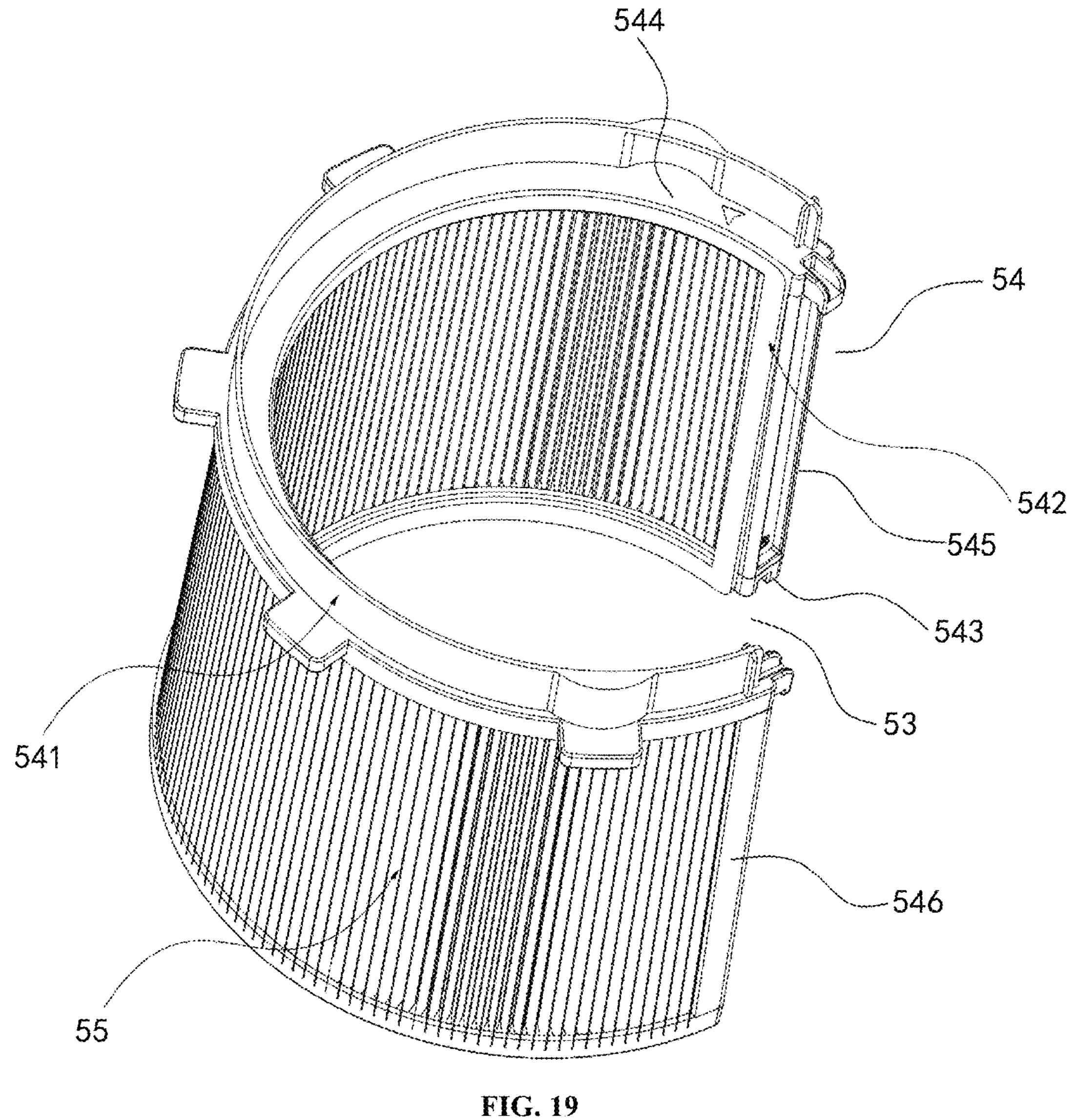
FIG. 19 is a schematic structural diagram of a filtering element of a dust collection pile shown according to an exemplary embodiment from a first view angle.

In some embodiments, as shown in FIG. 19, the filtering element 50 is provided with an opening 53, that is, the filtering element 50 is of a circumferential non-closed structure.

Optionally, the dust collection pile further includes an air inlet conduit 80. One end of the air inlet conduit 80 is communicated with the dust inlet channel 11, and the other end of the air inlet conduit 80 is communicated with the dust inlet end 21. The opening 53 can avoid the air inlet conduit 80.

Optionally, the body 10 further includes a communication pipeline 17. Two ends of the communication pipeline 17 are respectively communicated with the air inlet end 31 of the filtering assembly 30 and the airflow outlet end 22 of the dust barrel 20. The opening 53 can avoid the communication pipeline 17, so as to ensure the compactness of the structure.

Specifically, as shown in FIGS. 7 and 10, the body 10 is provided with a first channel 15. The first channel 15 communicates the air collecting port 51 of the filtering element 50 with the air outlet 42 of the fan assembly 40.

As shown in FIG. 10, the body 10 is provided with a mounting groove 16. The second mounting portion 14 has an accommodation groove where the filtering assembly 30 is mounted. The mounting groove 16 is disposed around the second mounting portion 14, and the filtering element 50 is located within the mounting groove 16. The first channel 15 is communicated with the mounting groove 16, where the mounting groove 16 surrounds a part of the second mounting portion 14, and thus, may be adapted to the filtering element 50 having the opening 53. A corresponding space within the opening 53 is used to form a space where the communication pipeline 17 and the air inlet conduit 80 are disposed.

Figure 20:
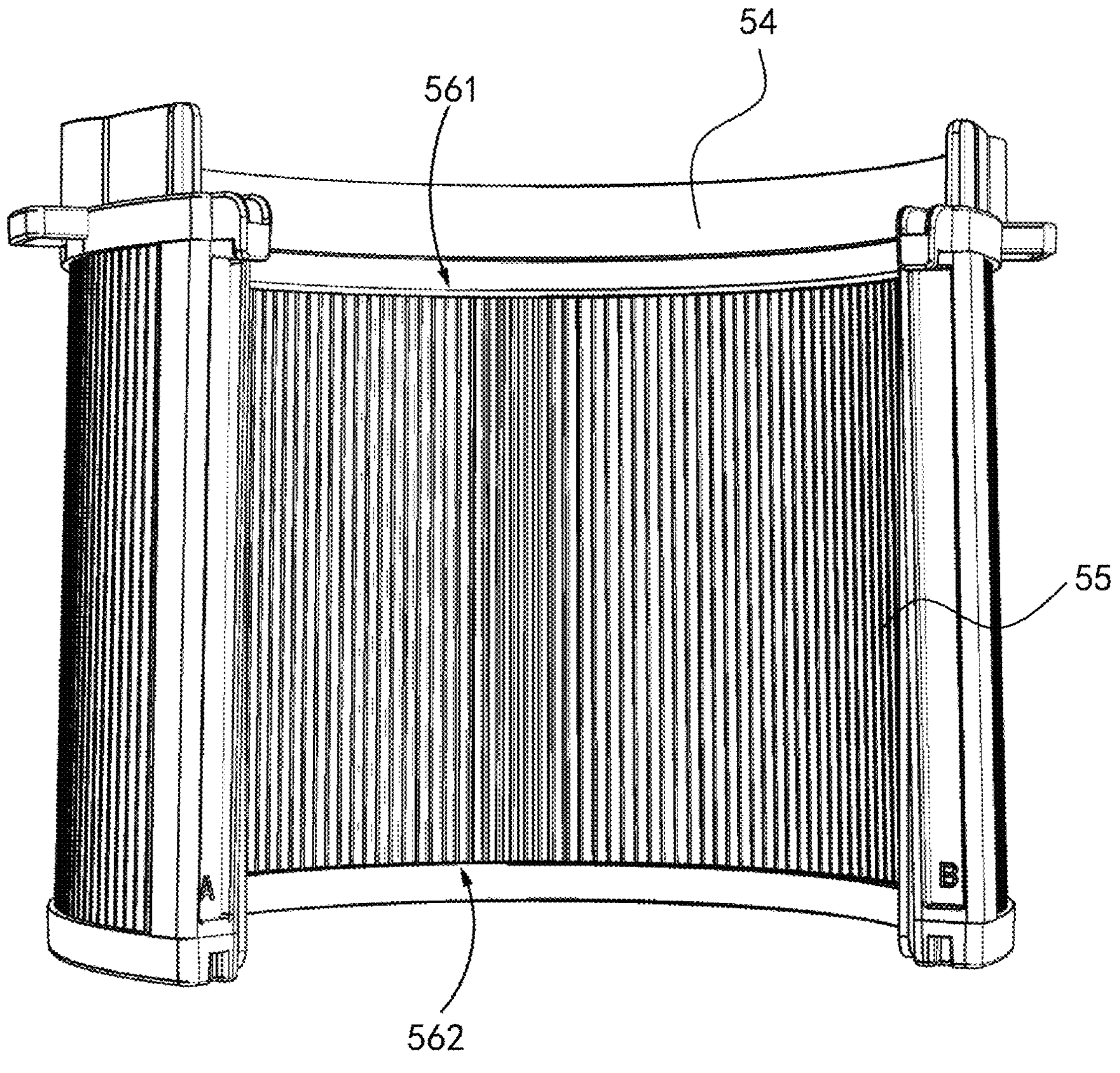
FIG. 20 is a schematic structural diagram of a filtering element of a dust collection pile shown according to an exemplary embodiment from a second view angle.
Figure 21:
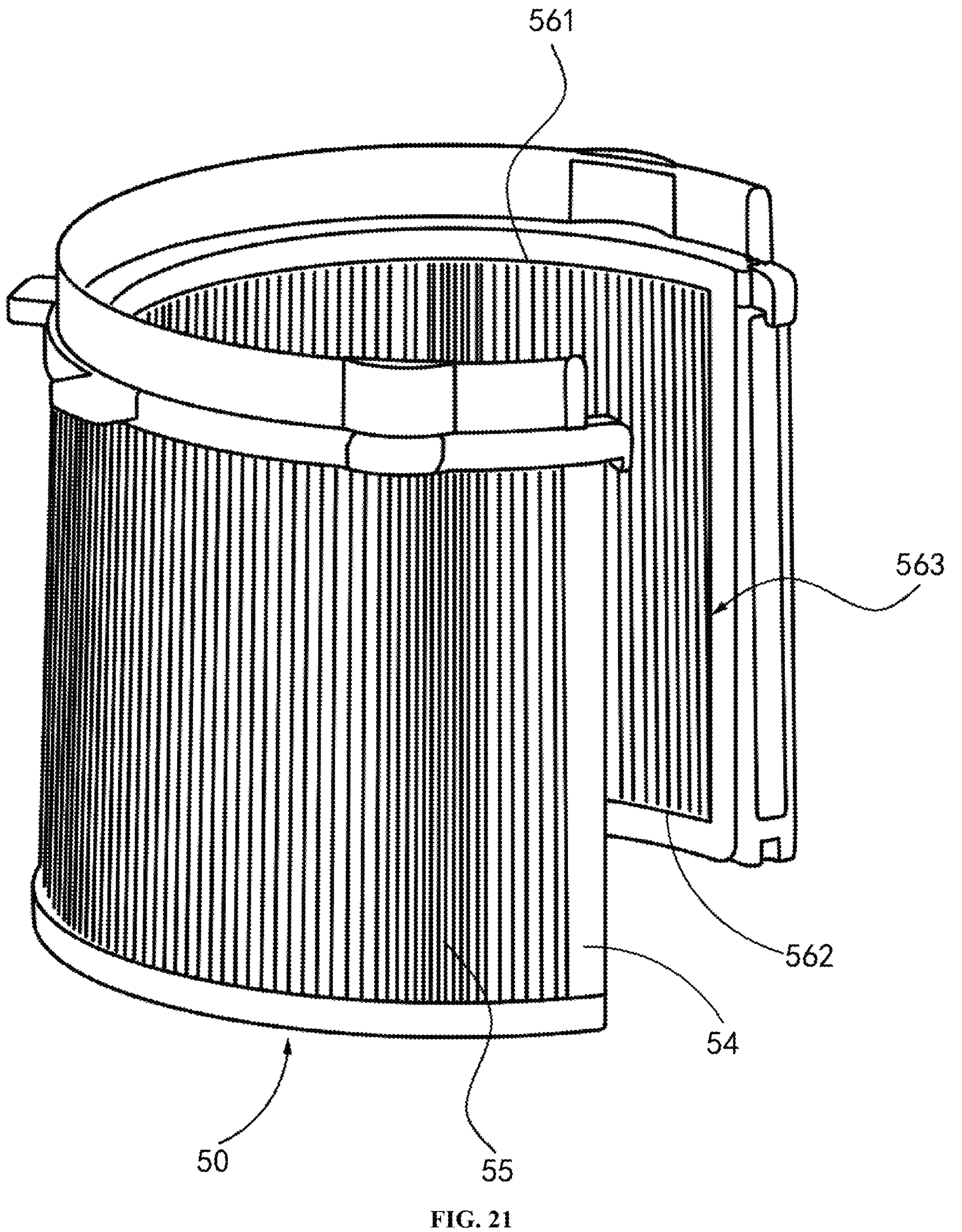
FIG. 21 is a schematic structural diagram of a filtering element of a dust collection pile shown according to an exemplary embodiment from a third view angle.
Figure 22:
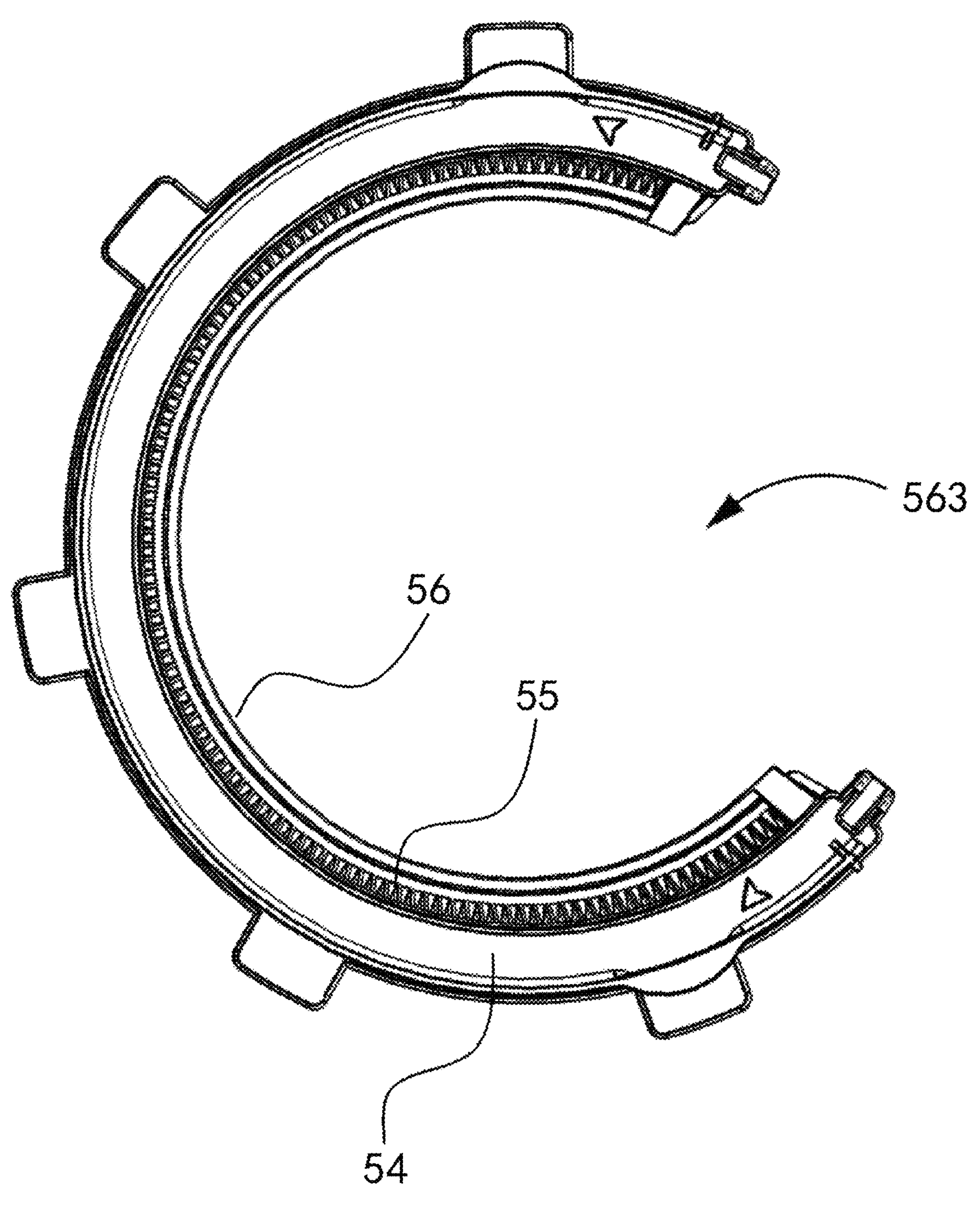
FIG. 22 is a schematic structural diagram of a filtering element of a dust collection pile shown according to an exemplary embodiment from a fourth view angle.

In some embodiments. as shown in FIGS. 20 to 22, the filtering element 50 includes a frame 54 and a filter screen 55, where the filter screen 55 is disposed on the frame 54, and the filter screen 55 is formed with an avoidance groove 56. The avoidance groove 56 includes a first opening 561, a second opening 562, and a third opening 563, where the first opening 561 and the second opening 562 are disposed opposite to each other, and two ends of the third opening 563 are communicated with the first opening 561 and the second opening 562 respectively. As a supporting structure for the filtering element 50, the frame 54 ensures the stability of the filtering element 50. The frame 54 is disposed on the body 10, and the avoidance groove 56 is configured to accommodate the second mounting portion 14 that accommodates the filtering assembly 30, so that the airflows discharged from the fan assembly 40 enter between the filtering element 50 and the second mounting portion 14.

It should be noted that the avoidance groove 56 includes the first opening 561, the second opening 562, and the third opening 563. The first opening 561 and the second opening 562 are disposed opposite to each other, and two ends of the third opening 563 are communicated with the first opening 561 and the second opening 562 respectively. That is, the frame 54 is adapted to the filter screen 55, so that the opening 53 is formed on the filtering element 50. The overall structure of the filtering element 50 may be similar to a C-shaped structure or may be a U-shaped structure, which is not limited here and may be determined according to the specific structure form of the second mounting portion 14, so as to ensure the reasonable distribution of the components.

The filtering element 50 in this embodiment includes the frame 54 and the filter screen 55, and the filter screen 55 is formed with the avoidance groove 56, so that the filtering element 50) can be enabled to avoid other internal structures, which can not only reduce the size of the filter screen 55, but also ensure reasonable arrangement of other components, thereby improving the usage performance of the filtering element 50.

In an embodiment, the filter screen 55 is an arc-shaped filter screen. That is, on the premise of ensuring an effective filtering area, the structure of the filter screen 55 may be reduced to the maximum extent, so as to be adapted to a circumferential outer surface of the second mounting portion 14.

In an embodiment, an area of the third opening 563 is less than an area of the filter screen 55, that is, it is ensured that the filter screen 55 has a sufficient filtering area.

In an embodiment, as shown in FIG. 19, the frame 54 includes a frame body 541 on which the filter screen 55 is disposed; and a sealing member 542, where the sealing member 542 is disposed inside the frame body 541, and the sealing member 542 is formed with a circumferential closed space to expose at least a part of the filter screen 55. The frame body 541 is configured to fix the filter screen 55, and the sealing member 542 may be adhered to the second mounting portion 14 to ensure that there is no gap between the sealing member 542 and the second mounting portion 14, thereby ensuring that the airflows must be discharged after filtered through the filter screen 55.

In an embodiment, the sealing member 542 includes hepa paper.

In an embodiment, as shown in FIG. 19, the frame body 541 includes a first support 543 and a second support 544. The second support 544 is disposed opposite to the first support 543. The filter screen 55 is connected between the second support 544 and the first support 543, and the sealing member 542 is disposed on inner sides of the second support 544 and the first support 543. The sealing member 542 may not only be used for sealing, but also implement the connection of the second support 544 and the first support 543.

In an embodiment, the frame body 541 further includes a first connecting section 545 having two ends respectively connected to the first support 543 and the second support 544; and a second connecting section 546 having two ends respectively connected to the first support 543 and the second support 544. The first connecting section 545 is disposed opposite to the second connecting section 546. The first support 543, the second support 544, the first connecting section 545, and the second connecting section 546 form a mounting space within which the filter screen 55 is located.

In an embodiment, the filter screen 55 includes a sealing foam.

Figure 23:
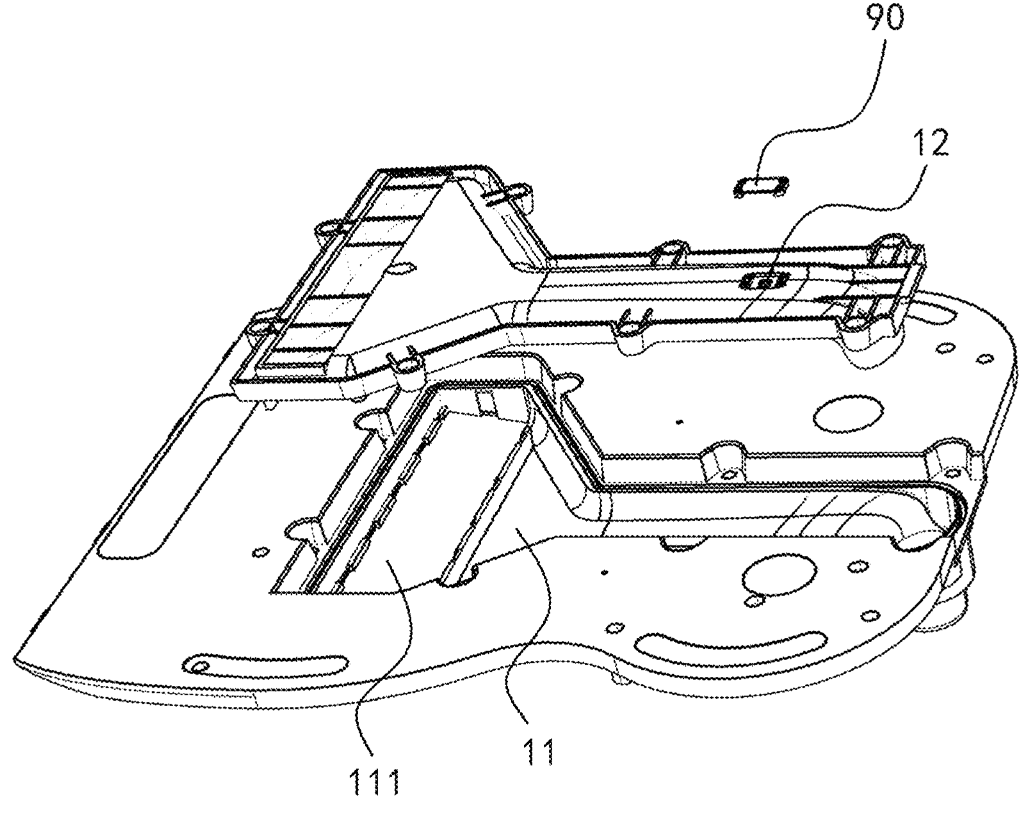
FIG. 23 is a schematic diagram of a disassembled structure of a base of a dust collection pile shown according to an exemplary embodiment.
Figure 24:
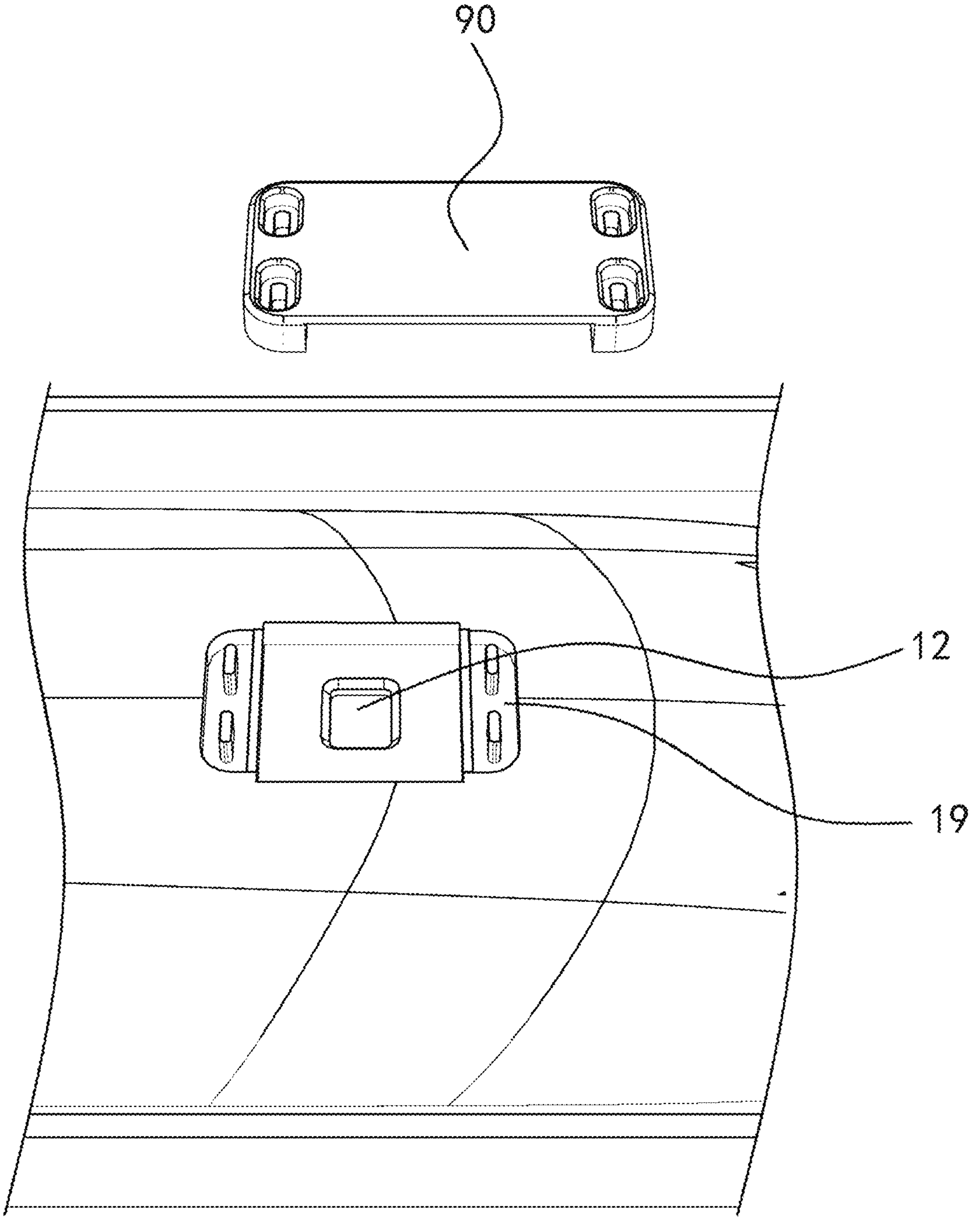
FIG. 24 is a schematic diagram of a separated structure of a shielding member and a sealing groove of a dust collection pile shown according to an exemplary embodiment.
Figure 25:
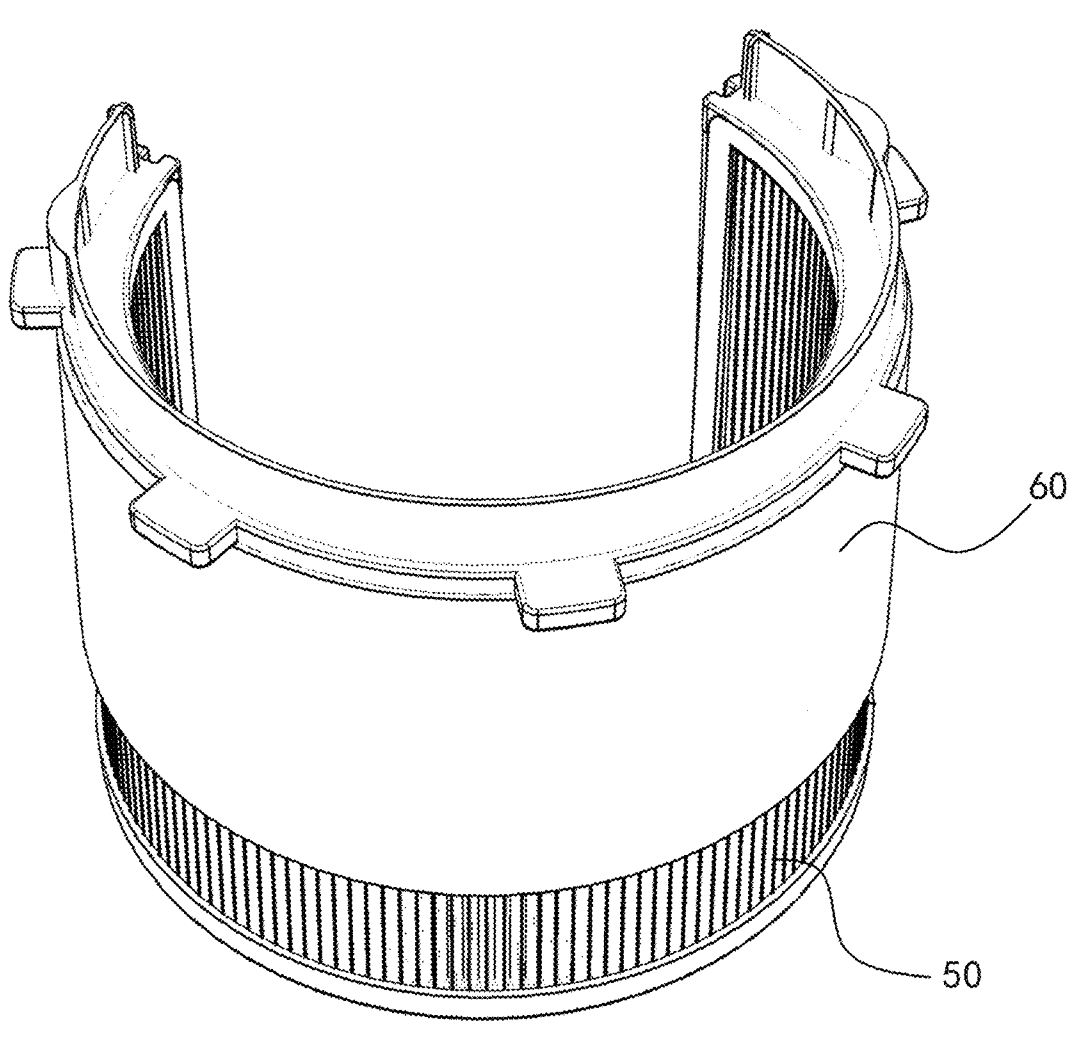
FIG. 25 is a schematic structural diagram of a filtering element and a spoiler of a dust collection pile shown according to an exemplary embodiment from a first view angle.
Figure 26:
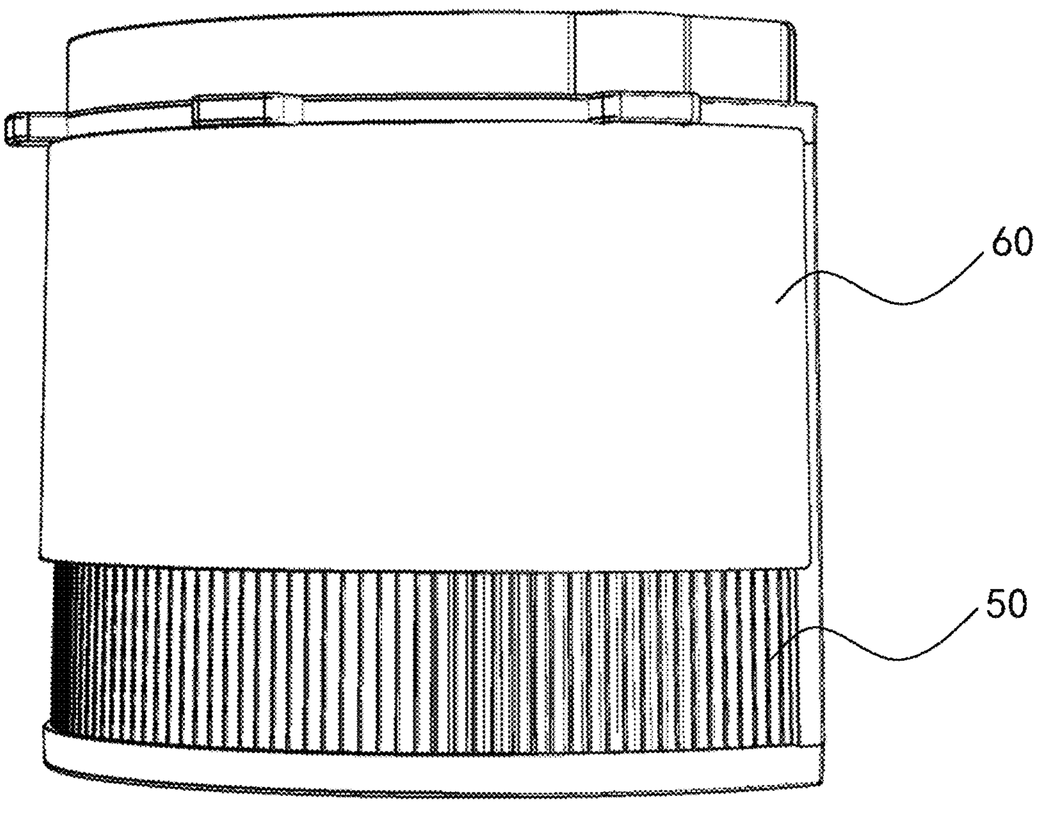
FIG. 26 is a schematic structural diagram of a filtering element and a spoiler of a dust collection pile shown according to an exemplary embodiment from a second view angle.
Figure 27:
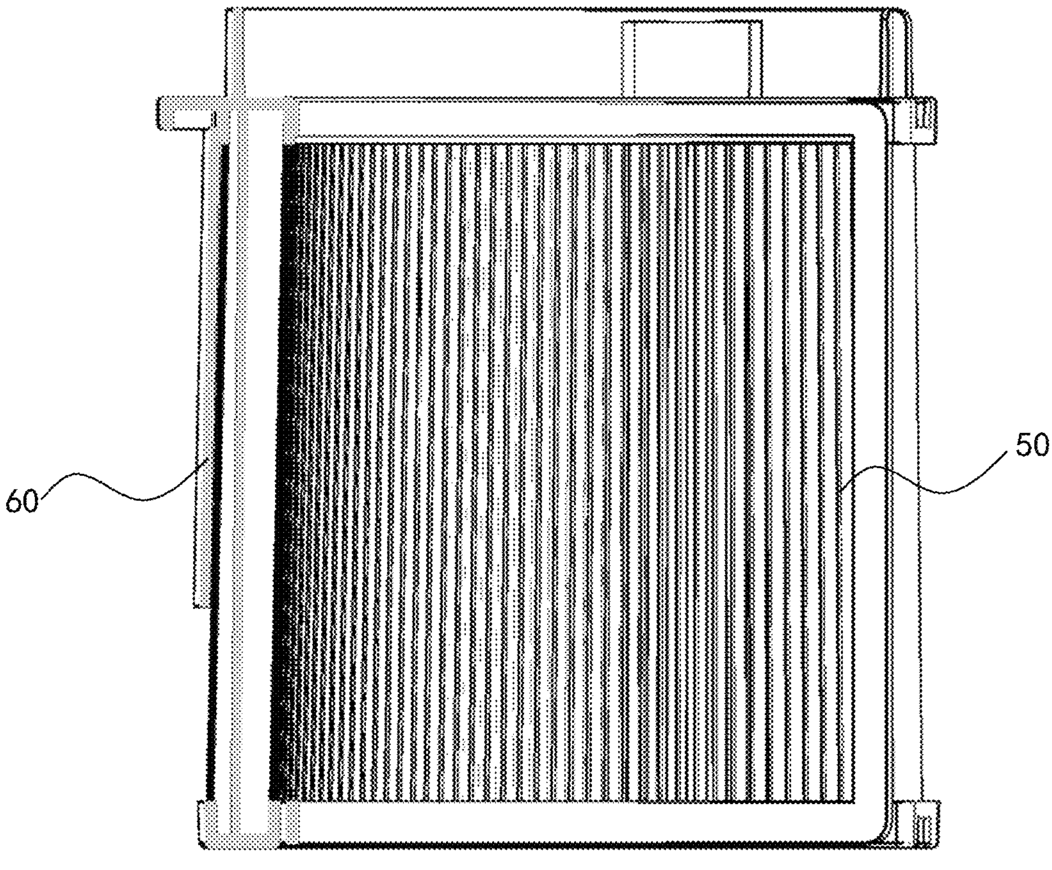
FIG. 27 is a schematic structural diagram of a filtering element and a spoiler of a dust collection pile shown according to an exemplary embodiment from a third view angle.

In an embodiment, as shown in FIGS. 23 and 24, the body 10 further includes a liquid outlet hole 12, where the liquid outlet hole 12 is formed in the base 101, and one end of the liquid outlet hole 12 is communicated with the dust inlet channel 11. Further, the liquid outlet hole 12 is located at the bottom of the body 10.

As shown in FIGS. 23 and 24, the dust collection pile further includes a shielding member 90 movably disposed on the body 10, so that the shielding member 90 has a sealed position in which the liquid outlet hole 12 is shielded and an open position in which the liquid outlet hole 12 is released. During the process of the dust in the dust box entering the dust inlet channel 11, the shielding member 90 is in the sealed position; and when the dust in the dust box stops entering the dust inlet channel 11, the shielding member 90 may move to the open position, so that the dust inlet channel 11 is communicated with the outside through the liquid outlet hole 12.

During the process of the dust in the dust box entering the dust inlet channel 11, it is necessary to ensure that the dust inlet channel 11 forms a negative pressure environment, so that the shielding member 90 closes the liquid outlet hole 12 to ensure that the dust inlet channel 11 is not communicated with the outside. In addition, when the dust in the dust box stops entering the dust inlet channel 11, the shielding member 90 may be opened, so that the dust inlet channel 11 is communicated with the outside. Liquid entering the dust inlet channel 11 may be discharged out of the dust inlet channel 11 through the liquid outlet hole 12, so as to ensure, to the maximum extent, that the dust inlet channel 11 is dry inside.

It should be noted that "the outside" described above may be interpreted as an external environment space, or may also be other space independent from the dust inlet channel 11. For example, a liquid collector may be provided to allow the liquid within the dust inlet channel 11 to flow into the liquid collector, and a space formed by the liquid collector may also be understood as the outside at this point.

In some embodiments, the shielding member 90 can be movably disposed on the body 10. and may be driven by a driving mechanism to move, so as to achieve closing and releasing of the liquid outlet hole 12. Specifically, the driving mechanism may be an air cylinder, an oil cylinder or an electric cylinder, and a telescopic rod of the driving mechanism may drive the shielding member 90 to move relative to the liquid outlet hole 12, thereby achieving the closing and releasing of the liquid outlet hole 12. Alternatively, the driving mechanism may include a motor, and the shielding member 90 is driven by the motor to rotate relative to the body 10, thereby achieving the closing and releasing of the liquid outlet hole 12.

It should be noted that, when the fan assembly 40 begins to run, that is, starts to clean the dust within the dust box, the shielding member 90 can rotate from the open position to the sealed position. Specifically, the control portion of the dust collection pile may control the above driving mechanism to drive the shielding member 90 to move from the open position to the sealed position prior to controlling the fan assembly 40 to run, or the control portion may control the fan assembly 40 and the above driving mechanism to run simultaneously. In addition, when the fan assembly 40 stops running, that is, stops cleaning the dust within the dust box, the shielding member 90 can rotate from the sealed position to the open position. Specifically, the control portion of the dust collection pile may control the above driving mechanism to drive the shielding member 90 to move from the sealed position to the open position after controlling the fan assembly 40 to stop running, or the control portion may control the above driving mechanism to run while controlling the fan assembly 40 to stop running.

In some embodiments, the shielding member 90 may be connected to the body 10, and the movement of the shielding member 90 does not depend on the driving mechanism. The shielding member 90 can rotate from the open position to the sealed position under the driving of the fan assembly 40. That is, when the fan assembly 40 is running, depending on the negative pressure generated by the fan assembly 40, the shielding member 90 may be driven to move from the open position to the sealed position. In addition, when the fan assembly 40 stops running, the shielding member 90 can rotate from the sealed position to the open position under the action of gravity.

Optionally, the shielding member 90 may be disposed on a plate body, and this plate body is rotatably disposed on the body 10, so as to ensure that the shielding member 90 rotates from the sealed position to the open position under the action of gravity.

In an embodiment, the liquid outlet hole 12 is communicated with one side of the dust inlet channel 11 close to the dust barrel 20. That is, when the fan assembly 40 is running, the liquid may flow from the dust inlet 111 to the dust barrel 20 along the dust inlet channel 11. Therefore, after the fan assembly 40 stops running, most of the liquid is gathered at one side close to the dust barrel 20. At this point, the liquid can flow out conveniently from the liquid outlet hole 12 by opening the liquid outlet hole 12.

In an embodiment, as shown in FIG. 24, the body 10 is provided with a sealing groove 19, and one end of the liquid outlet hole 12 is located within the sealing groove 19. When the shielding member 90 is in the sealed position, the shielding member 90 is located within the sealing groove 19, and the shielding member 90) can seal the liquid outlet hole 12 reliably at this point.

Optionally, when the shielding member 90 is in the sealed position, the shielding member 90 may be in a clearance fit with a side wall of the sealing groove 19 and may stop against the liquid outlet hole 12 reliably, so as to achieve sealing of the liquid outlet hole 12.

Optionally, when the shielding member 90 is in the sealed position, the shielding member 90 may be in an interference fit with the side wall of the sealing groove 19. That is, the shielding member 90) seals the sealing groove 19, so as to enable the sealing of the liquid outlet hole 12.

It should be noted that the sealing groove 19 may be disposed on one side of the liquid outlet hole 12 close to the dust inlet channel 11. That is, the sealing groove 19 is located within the dust inlet channel 11. At this point, the shielding member 90 may be driven by the driving mechanism to move.

Alternatively, the sealing groove 19 may be disposed on one side of the liquid outlet hole 12 away from the dust inlet channel 11. That is, the sealing groove 19 is located outside the dust inlet channel 11. At this point, the shielding member 90 may be driven by the fan assembly 40 to move, and may be disengaged from the sealing groove 19 under the action of gravity.

In an embodiment, the shielding member 90 is disposed on a plate body. This plate body allows the shielding member 90 to be disengaged from the sealing groove 19 under the action of gravity when the fan assembly 40 does not work. The plate body may be driven to rotate only when the fan assembly 40 works, so that the shielding member 90 is located within the sealing groove 19, so as to achieve the sealing of the liquid outlet hole 12.

In an embodiment, the shielding member 90 is rotatably disposed on the body 10, so that the shielding member 90 can be switched between the sealed position and the open position. The shielding member 90 may be rotated by the driving mechanism relative to the body 10, so as to seal or release the liquid outlet hole 12. Alternatively, the shielding member 90 may be enabled to rotate under the action of the fan assembly 40, and may rotate from the sealed position to the open position under the action of gravity.

In an embodiment, the shielding member 90 is disposed on one side of the body 10 away from the dust inlet channel 11. That is, the shielding member 90 may rotate from the sealed position to the open position under the action of gravity.

In an embodiment, at least a part of the shielding member 90 is a flexible member, which not only has strong structure stability, but also can better seal the liquid outlet hole 12.

Optionally, at least a part of the shielding member 90 is rubber, and the shielding member 90 may be a soft rubber sheet. After the fan assembly 40 runs and generates a negative pressure to suck up the soft rubber sheet, the liquid outlet hole 12 is blocked to achieve a sealing effect. When the fan assembly 40 does not work, the soft rubber sheet returns to its original position, and the liquid may flow out of the dust inlet channel 11 through the liquid outlet hole 12, so as to avoid the retention of a large amount of liquid within the dust inlet channel 11.

In some embodiments, the liquid outlet hole 12 may be a circular hole, a triangular hole or a rectangular hole. Of course, the liquid outlet hole 12 may also be an irregularly-shaped hole, which is not limited here. In addition, a specific structural shape of the sealing groove 19 for accommodating the shielding member 90 may also be circular, triangular or rectangular. Of course, the sealing groove 19 may also be an irregularly-shaped groove.

In an embodiment, a plurality of liquid outlet holes 12 is provided to increase a rate at which the liquid flows out and ensure that the liquid within the dust inlet channel 11 flows out reliably.

Optionally, at least one shielding member 90 is provided, where one shielding member 90 can shield a plurality of liquid outlet holes 12, so as to simplify the structure.

Optionally, a plurality of shielding members 90 is disposed in a one-to-one correspondence to a plurality of liquid outlet holes 12 to ensure that the respective shielding members 90 seal the respective liquid outlet holes 12 independently, thereby increasing the reliability of sealing.

In an embodiment, as shown in FIG. 9, the dust collection pile further includes a spoiler 60, where the spoiler 60 is disposed around the filtering element 50, and the spoiler 60 is disposed opposite to an air outlet surface 52 of the filtering element 50, thereby forming a spoiler channel 61. An air outlet channel 62 is formed between the spoiler 60 and the body 10, and a bottom end of the spoiler channel 61 is communicated with a bottom end of the air outlet channel 62. That is, airflows discharged from the air outlet surface 52 of the filtering element 50 can flow downward under the blocking of the spoiler 60, and flow from the bottom of the spoiler channel 61 into the air outlet channel 62. Therefore, the airflow paths may be increased, thereby achieving an effect of noise reduction.

Specifically, as shown in FIG. 9, the spoiler 60 includes a first surface 63 and a second surface 64 opposite to each other, where the first surface 63 is disposed opposite to the air outlet surface 52 of the filtering element 50) to form the spoiler channel 61, and the second surface 64 is disposed opposite to the body 10 to form the air outlet channel 62. The bottom end of the spoiler channel 61 is communicated with the bottom end of the air outlet channel 62, so that the airflows discharged from the air outlet surface 52 can enter the air outlet channel 62 from the bottom end of the spoiler channel 61, thereby increasing the airflow paths.

In an embodiment, at least one of the body 10 and the filtering element 50 is connected to the spoiler 60, for fixing the spoiler 60, thereby ensuring that the spoiler 60 stably guides airflow.

In an embodiment, the upper side of the spoiler 60 is connected to at least one of the body 10 and the filtering element 50 to avoid a top end of the spoiler channel 61 from being directly communicated with a top end of the air outlet channel 62, that is, to prevent the airflows from flowing from the top end of the spoiler channel 61 into the air outlet channel 62.

Optionally, the spoiler 60 may be connected to the body 10, so that a sealed connection is formed between the top end of the spoiler 60 and the body 10.

Optionally, as shown in conjunction with FIGS. 25 to 28, the top of the spoiler 60 is fixedly connected to the filtering element 50. That is, the top of the spoiler 60 may be connected to a frame 54 of the filtering element 50, so as to form a sealed connection between the top end of the spoiler 60 and the filtering element 50.

In an embodiment, the bottom end of the spoiler 60 is disposed in a suspended manner, so that the bottom end of the spoiler channel 61 is communicated with the bottom end of the air outlet channel 62. That is, both the filtering element 50 and the body 10 may not be in contact with the bottom end of the spoiler 60, so that the airflows enter the air outlet channel 62 along the bottom end of the spoiler 60.

Optionally, the bottom end of the spoiler 60 may be lower than the bottom end of the air outlet surface 52, as long as it is ensured that a sealed connection is not formed between the bottom end of the spoiler 60 and the body 10.

Optionally, the bottom end of the spoiler 60 is higher than the bottom end of the air outlet surface 52. That is, a part of the airflows discharged from the air outlet surface 52 may not be stopped by the spoiler 60 as well.

Figure 28:
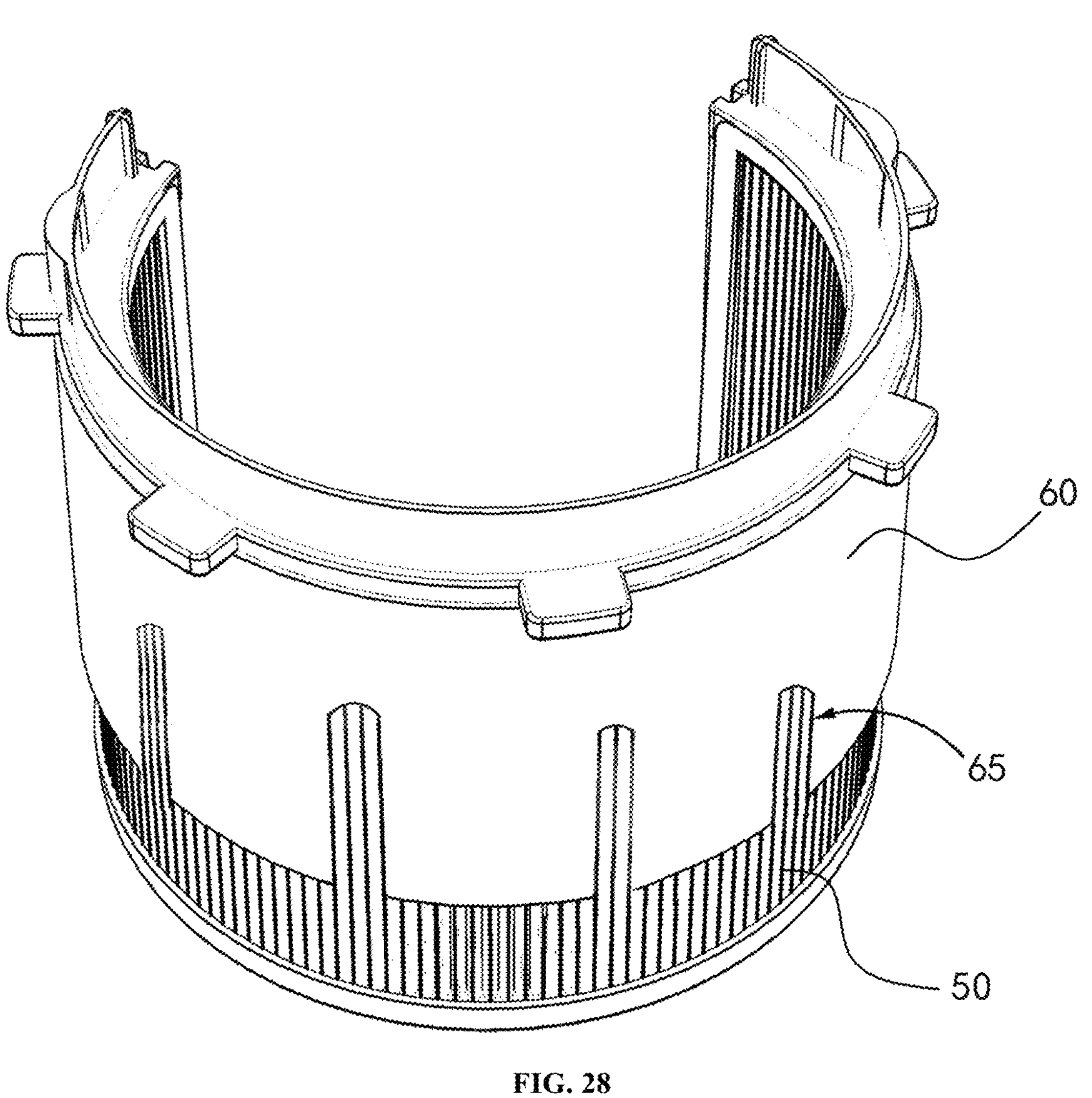
FIG. 28 is a schematic structural diagram of a filtering element and a spoiler of a dust collection pile shown according to another exemplary embodiment.

In an embodiment, as shown in FIG. 28, the spoiler 60 is provided with a communication channel 65. The spoiler channel 61 is also communicated with the air outlet channel 62 through the communication channel 65. That is, the communication channel 65 may allow some of the airflows to enter the air outlet channel 62, thereby preventing a large amount of airflows from directly impacting the spoiler 60. Therefore, the noise caused by airflow impacting may also be avoided while ensuring that flowing paths of some of the airflows are enlarged.

In some embodiments, the communication channel 65 is a through hole, which is located in a middle portion of the spoiler 60. That is, the spoiler channel 61 is also communicated with the air outlet channel 62 through the through hole.

In some embodiments, the communication channel 65 is a notch, which recesses upward from the bottom end of the spoiler 60. That is, it can be understood that an opening is formed on the spoiler 60 to release the airflows directly.

In an embodiment, a plurality of communication channels 65 is provided, so as to ensure that the airflows at different positions can enter the air outlet channel 62 directly through the communication channels 65.

In an embodiment, the air outlet surface 52 includes a curved surface. The spoiler 60 includes an arc-shaped plate disposed opposite to the curved surface. The plurality of communication channels 65 are disposed along a circumferential direction of the arc-shaped plate at intervals. The shape of the spoiler 60 is adapted to the air outlet surface 52, which may not only ensure reliable filtering, but also enable the structure to have a reasonable layout.

Figure 2:
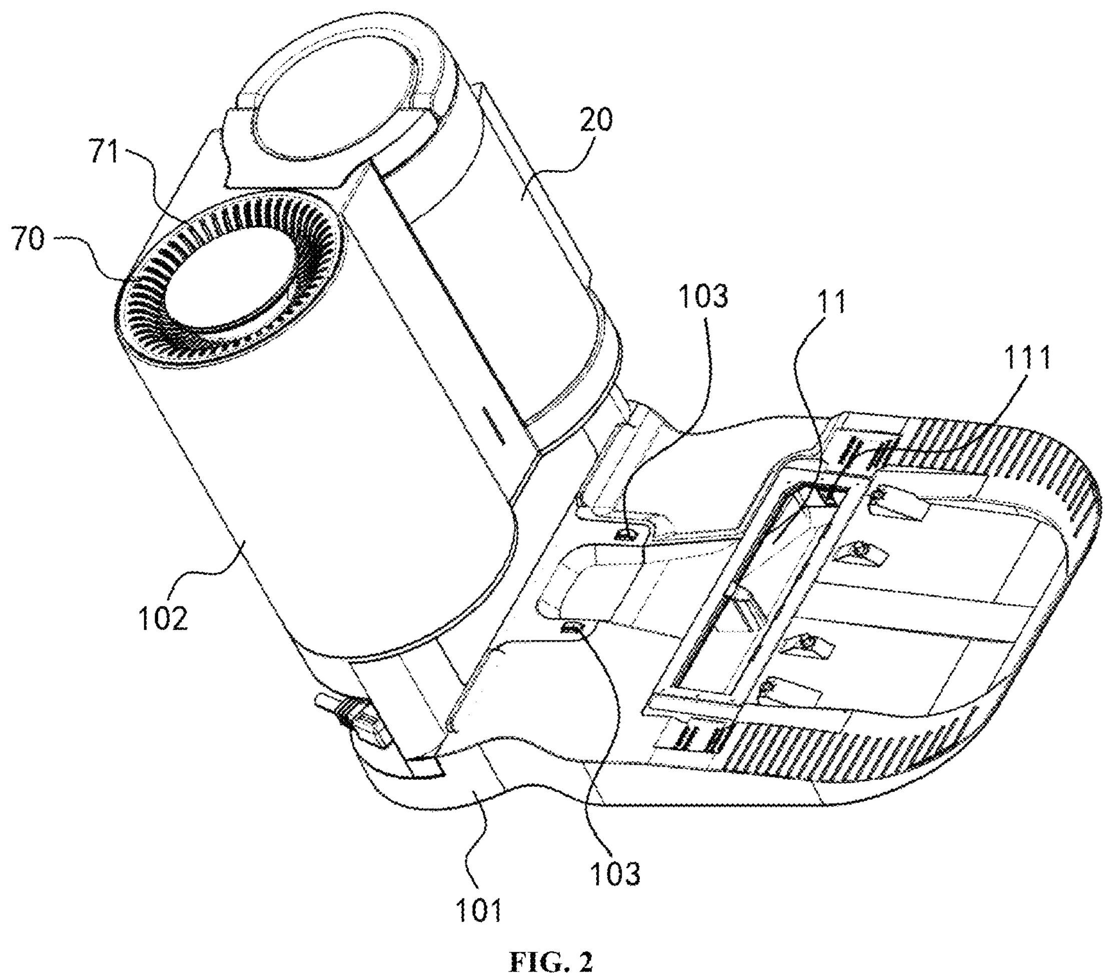
FIG. 2 is a schematic structural diagram of a dust collection pile shown according to an exemplary embodiment from a first view angle.
Figure 3:
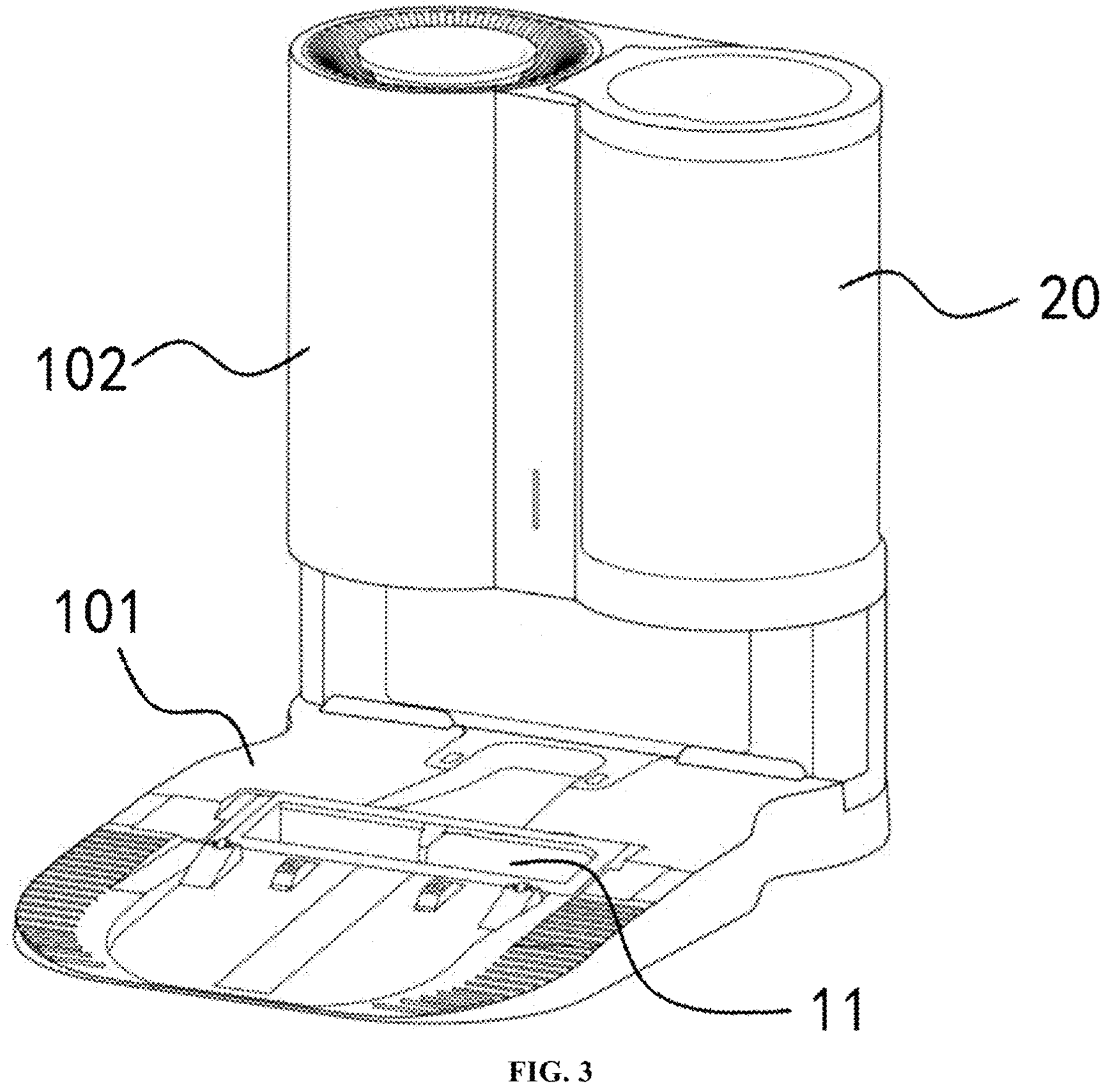
FIG. 3 is a schematic structural diagram of a dust collection pile shown according to an exemplary embodiment from a second view angle.
Figure 4:
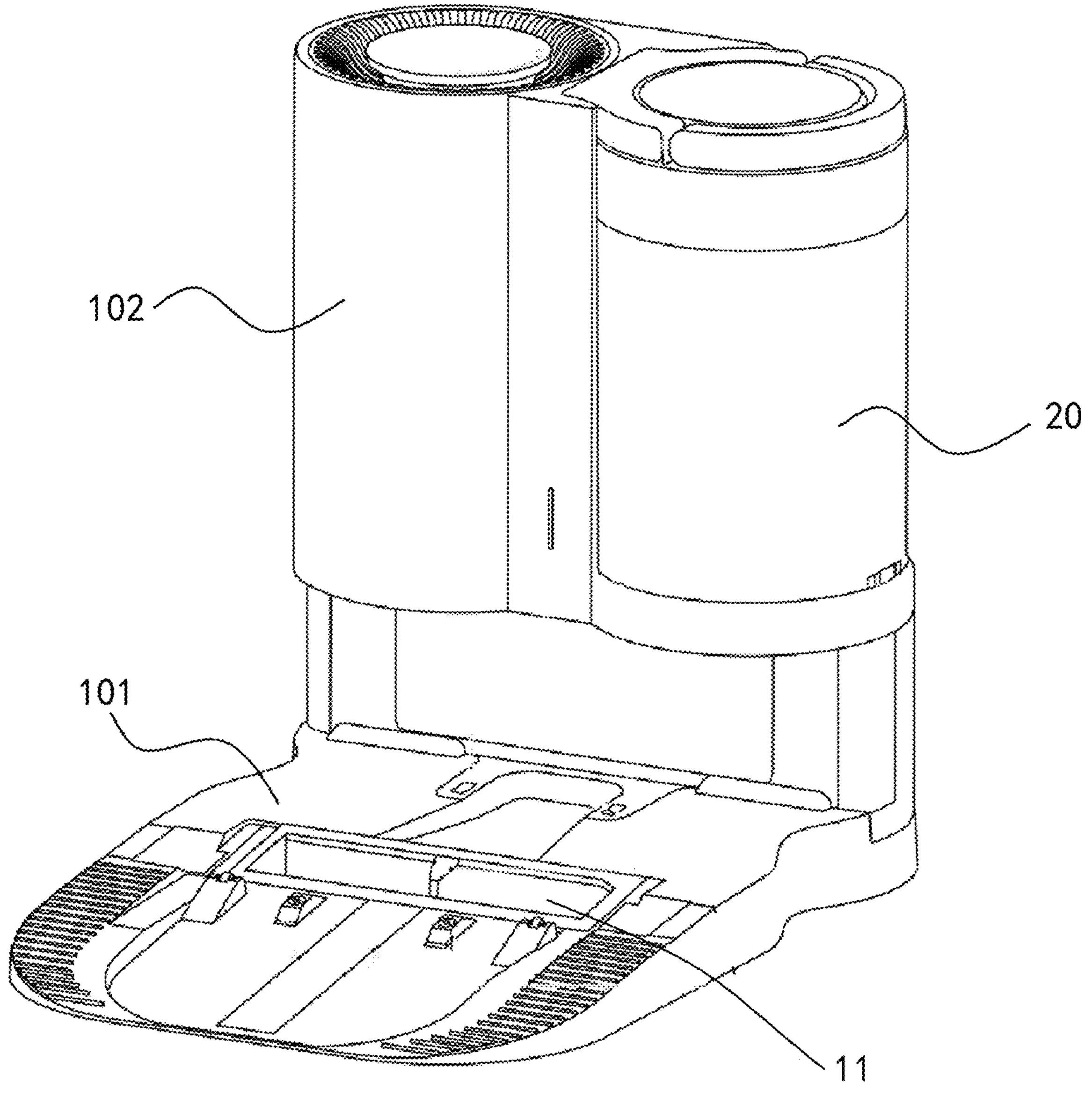
FIG. 4 is a schematic structural diagram of a dust collection pile shown according to an exemplary embodiment from a third view angle.

In an embodiment, as shown in FIGS. 2 and 6, the dust collection pile further includes an air outlet plate 70. The air outlet plate 70 is disposed above the filtering element 50. The air outlet plate 70 is provided with through holes 71, and the through holes 71 are communicated with the top end of the air outlet channel 62. That is, the airflows entering the air outlet channel 62 flow upward, and thus the airflows are discharged through the through holes 71 on the air outlet plate 70. Under the action of the spoiler 60, the airflows may be formed from top to bottom, and then discharged from bottom to top, thereby achieving the purpose of noise reduction by lengthening the airflow paths greatly.

Optionally, the through holes 71 of the air outlet plate 70 may be communicated with the air outlet surface 52 of the filtering element 50 directly. That is, the spoiler 60 may be removed, and the airflows out of the air outlet surface 52 of the filtering element 50 may be discharged through the through holes 71 of the air outlet plate 70 directly.

As shown in FIG. 2, the dust collection pile further includes first charging contact tabs 103, and the cleaning robot further includes second charging contact tabs. The first charging contact tabs 103 are electrically connected to the second charging contact tabs to allow the dust collection pile to charge the cleaning robot. The first charging contact tabs 103 may be disposed on the body 10. Further, the first charging contact tabs 103 may be disposed on the base 101. In addition, the first charging contact tabs 103 are located on the same surface as the dust inlet 111. and the first charging contact tabs 103 and the dust inlet 111 are spaced from each other.

In an embodiment, a plurality of first charging contact tabs 103 and a plurality of second charging contact tabs are disposed in pairs.

The cleaning robot needs to be moved onto the body 10 for subsequent dust box cleaning or charging.

Specifically, the cleaning robot may move along the body 10, that is, the cleaning robot may perform a pile climbing motion. The pile climbing motion may be understood as follows: when a distance between the cleaning robot and the body 10 is less than a certain threshold, for example, when the cleaning robot has reached the vicinity of the body 10, the cleaning robot will move in a certain direction more apparent. In addition, a heading direction of the pile climbing motion may be understood as follows; in order to discharge the dust in the dust box into the dust inlet channel 11 or in order to make the second charging contact tabs to be in contact with the first charging contact tabs 103, the cleaning robot moves from a first position point to a second position point, and a direction from the first position point to the second position point is the heading direction of the pile climbing motion.

According to a first aspect of the present disclosure, a filtering element is provided. The filtering element includes a frame; and a filter screen, where the filter screen is disposed on the frame, an avoidance groove is formed in the filter screen, the avoidance groove includes a first opening, a second opening and a third opening, the first opening and the second opening are disposed opposite to each other, and both ends of the third opening are communicated with the first opening and the second opening respectively.

In an embodiment of the present disclosure, the filter screen is an arc-shaped filter screen.

In an embodiment of the present disclosure, an area of the first opening is less than that of the second opening.

In an embodiment of the present disclosure, an area of the third opening is less than an area of the filter screen.

In an embodiment of the present disclosure, the frame includes a frame body, on which the filter screen is disposed; and a sealing member, where the sealing member is disposed inside the frame body, and the sealing member is formed with a circumferential closed space to expose at least a part of the filter screen.

In an embodiment of the present disclosure, the sealing member includes hepa paper.

In an embodiment of the present disclosure, the frame body includes a first support; and a second support, where the second support is disposed to face the first support, the filter screen is connected between the second support and the first support, and the sealing member is disposed on inner sides of the second support and the first support.

In an embodiment of the present disclosure, the frame body further includes a first connecting section having two ends respectively connected to the first support and the second support; and a second connecting section having two ends respectively connected to the first support and the second support, where the first connecting section is disposed oppositely to the second connecting section, and the first support, the second support, the first connecting section, and the second connecting section form a mounting space within which the filter screen is located.

In an embodiment of the present disclosure, the filter screen includes a sealing foam.

According to a second aspect of the present disclosure, a dust collection pile is provided. The dust collection pile includes the above-mentioned filtering element.

According to a third aspect of the present disclosure, a cleaning system is provided. The cleaning system includes the above-mentioned dust collection pile and a cleaning robot.

According to the embodiments of the present disclosure, the filtering element includes the frame and the filter screen, and the filter screen is formed with the avoidance groove to enable the filtering element to avoid other internal structures, so that the size of the filter screen can be reduced, and other components can be reasonably arranged, thereby improving the usage performance of the filtering element.

Other embodiments of the present disclosure are easily conceivable to those skilled in the art after considering the specification and practicing the present invention disclosed here. The present disclosure is intended to cover any variants, usages or adaptive changes to the present invention. These variants, uses or adaptive changes follow the general principles of the present disclosure and include common knowledge or customary technical means in the art not disclosed in the present disclosure. The specification and exemplary embodiments are considered to be exemplary merely. The true scope and spirit of the present disclosure is indicated by the appended claims.

It should be understood that the present disclosure is not limited to the precise structures that have been described above and shown in the accompanying drawings, and various modifications and changes can be made thereto without departing from the scope thereof. The protection scope of the present disclosure is only limited by the appended claims.

What is claimed is:

1. A dust collection pile, comprising:

a body, a dust barrel, a filtering assembly, a fan assembly, a filtering element, a communication pipe, a first channel and a second channel;

two ends of the communication pipe are respectively communicated with an air inlet end of the filtering assembly and an airflow outlet end of the dust barrel, the second channel communicates an air outlet end of the filtering assembly with an air inlet of the fan assembly;

the first channel communicates an air collecting port of the filtering element with an air outlet of the fan assembly;

wherein the filtering element comprises:

a frame; and a filter screen, wherein the filter screen is disposed on the frame, the filter screen is formed with an avoidance groove, wherein the filtering element is disposed around the filtering assembly, the filtering assembly is disposed above the fan assembly.

2. The dust collection pile according to claim 1, wherein the filter screen is an arc-shaped filter screen.

3. The dust collection pile according to claim 1, wherein the avoidance groove comprises a first opening, a second opening, and a third opening, the first opening and the second opening are disposed opposite to each other, and both ends of the third opening penetrate through the first opening and the second opening.

4. The dust collection pile according to claim 1, further comprising an air inlet conduit, wherein the body comprises a dust inlet channel, one end of the air inlet conduit is communicated with the dust inlet channel, and the other end of the air inlet conduit is communicated with a dust inlet end of the dust barrel.

5. The dust collection pile according to claim 4, wherein the avoidance groove avoids the air inlet conduit and the communication pipe.

6. The dust collection pile according to claim 3, wherein an area of the first opening is less than an area of the second opening.

7. The dust collection pile according to claim 3, wherein an area of the third opening is less than an area of the filter screen.

8. The dust collection pile according to claim 1, wherein the frame comprises:

a frame body, on which the filter screen is disposed; and a sealing member, wherein the sealing member is disposed inside the frame body, and the sealing member forms a circumferential closed space to expose at least a part of the filter screen.

9. The dust collection pile according to claim 8, wherein the sealing member comprises hepa paper.

10. The dust collection pile according to claim 8, wherein the frame body comprises:

a first support; and a second support, wherein the second support is disposed opposite to the first support, the filter screen is connected between the second support and the first support, and the sealing member is disposed on inner sides of the second support and the first support.

11. The dust collection pile according to claim 10, wherein the frame body further comprises:

a first connecting section having two ends respectively connected to the first support and the second support; and a second connecting section having two ends respectively connected to the first support and the second support, wherein the first connecting section is disposed opposite to the second connecting section, and the first support, the second support, the first connecting section, and the second connecting section form a mounting space within which the filter screen is located.

12. The dust collection pile according to claim 1, wherein the filter screen comprises a sealing foam.

13. A cleaning system, comprising:

a dust collection pile; and a cleaning robot, wherein the dust collection pile comprises a body, a dust barrel, a filtering assembly, a fan assembly, a filtering element, a communication pipe, a first channel and a second channel;

two ends of the communication pipe are respectively communicated with an air inlet end of the filtering assembly and an airflow outlet end of the dust barrel;

the second channel communicates an air outlet end of the filtering assembly with an air inlet of the fan assembly:

the first channel communicates an air collecting port of the filtering element with an air outlet of the fan assembly;

wherein the filtering element comprises:

a frame; and a filter screen, wherein the filter screen is disposed on the frame, the filter screen is formed with an avoidance groove, wherein the filtering element is disposed around the filtering assembly, the filtering assembly is disposed above the fan assembly.

* * * * *